(12) United States Patent
Asefi et al.

(10) Patent No.: US 12,333,551 B2
(45) Date of Patent: *Jun. 17, 2025

(54) TOKEN MANAGEMENT SYSTEM

(71) Applicant: Wells Fargo Bank, N.A., San Francisco, CA (US)

(72) Inventors: Azita Asefi, Vacaville, CA (US); Jorge Michirefe, Phoenix, AZ (US); Al Hecht, Chanhassen, MN (US); Steve Puffer, Champlin, MN (US); Peter Ho, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,996

(22) Filed: Nov. 20, 2023

(65) Prior Publication Data

US 2024/0086931 A1 Mar. 14, 2024

Related U.S. Application Data

(63) Continuation of application No. 17/897,551, filed on Aug. 29, 2022, now Pat. No. 11,823,205, which is a
(Continued)

(51) Int. Cl.
*G06Q 20/40* (2012.01)
*G06F 21/62* (2013.01)
(Continued)

(52) U.S. Cl.
CPC ........... *G06Q 20/405* (2013.01); *G06F 21/62* (2013.01); *G06Q 20/34* (2013.01); *G06Q 20/367* (2013.01);
(Continued)

(58) Field of Classification Search
CPC .... G06Q 20/405; G06Q 20/34; G06Q 20/367; G06Q 20/3672; G06Q 20/401; G06Q 30/02; G06F 21/62
See application file for complete search history.

(56) References Cited

U.S. PATENT DOCUMENTS 2,751,554 A 6/1956 Schlesinger et al.
5,485,510 A 1/1996 Colbert
(Continued)

FOREIGN PATENT DOCUMENTS

AU 2006335151 A1 7/2007
AU 2006227177 A1 10/2007
(Continued)

OTHER PUBLICATIONS

Technologies for Payment Fraud Prevention: EMV, Encryption, and Tokenization, Oct. 2014, Smart Card Alliance, pp. 1-34 (Year: 2014).*
(Continued)

*Primary Examiner* — Nilesh B Khatri
(74) *Attorney, Agent, or Firm* — Foley & Lardner LLP

(57) ABSTRACT

A computer system includes a token repository configured to store payment tokens, and a server system. The server system includes a processor and instructions stored in non-transitory machine-readable media, the instructions configured to cause the server system to receive a request to provision a payment token based on a financial product, wherein the request includes information related to the financial product, provision a payment token based on the token request, including authenticating the financial product based on the financial product information and generating the payment token upon authenticating the financial product,
(Continued)

wherein the payment token is useable to make a payment via the financial product, and store the payment token in the token repository.

20 Claims, 5 Drawing Sheets

Related U.S. Application Data continuation of application No. 15/081,536, filed on Mar. 25, 2016, now Pat. No. 11,429,975.

(60) Provisional application No. 62/139,525, filed on Mar. 27, 2015.

(51) Int. Cl.
    *G06Q 20/34*      (2012.01)
    *G06Q 20/36*      (2012.01)
    *G06Q 30/02*      (2023.01)

(52) U.S. Cl.
    CPC ....... *G06Q 20/3672* (2013.01); *G06Q 20/401* (2013.01); *G06Q 30/02* (2013.01)

(56) References Cited

U.S. PATENT DOCUMENTS

| | | |
|---|---|---|
| 5,573,457 A | 11/1996 | Watts et al. |
| 5,737,423 A | 4/1998 | Manduley |
| 5,953,710 A | 9/1999 | Fleming |
| 5,999,978 A | 12/1999 | Angal et al. |
| 6,047,268 A | 4/2000 | Bartoli et al. |
| 6,105,006 A | 8/2000 | Davis et al. |
| 6,188,309 B1 | 2/2001 | Levine |
| 6,193,152 B1 | 2/2001 | Fernando et al. |
| 6,408,330 B1 | 6/2002 | Delahuerga |
| 6,422,462 B1 | 7/2002 | Cohen |
| 6,494,367 B1 | 12/2002 | Zacharias |
| 6,575,361 B1 | 6/2003 | Graves et al. |
| 6,717,592 B2 | 4/2004 | Gusler et al. |
| 6,845,906 B2 | 1/2005 | Royer et al. |
| 6,865,547 B1 | 3/2005 | Brake et al. |
| 6,879,965 B2 | 4/2005 | Fung et al. |
| 6,910,021 B2 | 6/2005 | Brown et al. |
| 6,931,382 B2 | 8/2005 | Laage et al. |
| 6,980,969 B1 | 12/2005 | Tuchler et al. |
| 7,014,107 B2 | 3/2006 | Singer et al. |
| 7,016,877 B1 | 3/2006 | Steele et al. |
| 7,107,243 B1 | 9/2006 | McDonald et al. |
| 7,155,411 B1 | 12/2006 | Blinn et al. |
| 7,219,833 B2 | 5/2007 | Cantini et al. |
| 7,225,156 B2 | 5/2007 | Fisher et al. |
| 7,249,099 B2 | 7/2007 | Ling |
| 7,264,154 B2 | 9/2007 | Harris |
| 7,319,986 B2 | 1/2008 | Praisner et al. |
| 7,331,518 B2 | 2/2008 | Rable |
| 7,347,361 B2 | 3/2008 | Lovett |
| 7,359,880 B2 | 4/2008 | Abel et al. |
| 7,383,988 B2 | 6/2008 | Slonecker, Jr. |
| 7,383,998 B2 | 6/2008 | Parker et al. |
| 7,392,224 B1 | 6/2008 | Bauer et al. |
| 7,398,248 B2 | 7/2008 | Phillips et al. |
| 7,401,731 B1 | 7/2008 | Pletz et al. |
| 7,413,113 B1 | 8/2008 | Zhu |
| 7,451,395 B2 | 11/2008 | Brants et al. |
| 7,512,563 B2 | 3/2009 | Likourezos et al. |
| 7,552,088 B2 | 6/2009 | Malcolm |
| 7,571,142 B1 | 8/2009 | Flitcroft et al. |
| 7,587,365 B2 | 9/2009 | Malik et al. |
| 7,594,258 B2 | 9/2009 | Mao et al. |
| 7,653,597 B1 | 1/2010 | Stevanovski et al. |
| 7,685,037 B2 | 3/2010 | Reiners et al. |
| 7,689,502 B2 | 3/2010 | Lilly et al. |
| 7,698,221 B2 | 4/2010 | Blinn et al. |
| 7,707,082 B1 | 4/2010 | Lapstun et al. |
| 7,712,655 B2 | 5/2010 | Wong |
| 7,740,170 B2 | 6/2010 | Singh et al. |
| 7,753,265 B2 | 7/2010 | Harris |
| 7,778,932 B2 | 8/2010 | Yan |
| 7,818,319 B2 | 10/2010 | Henkin et al. |
| 7,857,212 B1 | 12/2010 | Matthews |
| 7,873,573 B2 | 1/2011 | Realini |
| 7,930,228 B1 | 4/2011 | Hawkins et al. |
| 7,937,325 B2 | 5/2011 | Kumar et al. |
| 7,941,534 B2 | 5/2011 | De La Huerga |
| 7,949,572 B2 | 5/2011 | Perrochon et al. |
| 7,954,704 B1 | 6/2011 | Gephart et al. |
| 8,090,346 B2 | 1/2012 | Cai |
| 8,099,109 B2 | 1/2012 | Altman et al. |
| 8,127,982 B1 | 3/2012 | Casey et al. |
| 8,160,933 B2 | 4/2012 | Nguyen et al. |
| 8,175,938 B2 | 5/2012 | Olliphant et al. |
| 8,196,131 B1 | 6/2012 | Von Behren et al. |
| 8,245,909 B2 | 8/2012 | Pletz et al. |
| 8,249,983 B2 | 8/2012 | Dilip et al. |
| 8,255,323 B1 | 8/2012 | Casey et al. |
| 8,266,031 B2 | 9/2012 | Norris et al. |
| 8,266,205 B2 | 9/2012 | Hammad et al. |
| 8,280,786 B1 | 10/2012 | Weiss et al. |
| 8,280,788 B2 | 10/2012 | Perlman |
| 8,296,228 B1 | 10/2012 | Kloor |
| 8,297,502 B1 | 10/2012 | McGhie et al. |
| 8,301,566 B2 | 10/2012 | Mears |
| 8,332,294 B1 | 12/2012 | Thearling |
| 8,359,531 B2 | 1/2013 | Grandison et al. |
| 8,360,952 B2 | 1/2013 | Wissman et al. |
| 8,364,556 B2 | 1/2013 | Nguyen et al. |
| 8,396,808 B2 | 3/2013 | Greenspan |
| 8,407,136 B2 | 3/2013 | Bard et al. |
| 8,407,142 B1 | 3/2013 | Griggs |
| 8,423,349 B1 * | 4/2013 | Huynh .................. G06F 40/56 704/9 |
| 8,473,394 B2 | 6/2013 | Marshall |
| 8,489,761 B2 | 7/2013 | Pope et al. |
| 8,489,894 B2 | 7/2013 | Comrie et al. |
| 8,543,506 B2 | 9/2013 | Grandcolas et al. |
| 8,589,335 B2 | 11/2013 | Smith et al. |
| 8,595,074 B2 | 11/2013 | Sharma et al. |
| 8,595,098 B2 | 11/2013 | Starai et al. |
| 8,625,838 B2 | 1/2014 | Song et al. |
| 8,630,952 B2 | 1/2014 | Menon |
| 8,635,687 B2 | 1/2014 | Binder |
| 8,639,629 B1 | 1/2014 | Hoffman |
| 8,655,310 B1 | 2/2014 | Katzer et al. |
| 8,655,719 B1 * | 2/2014 | Li ..................... G06Q 30/0641 705/14.1 |
| 8,660,926 B1 | 2/2014 | Wehunt et al. |
| 8,666,411 B2 | 3/2014 | Tokgoz et al. |
| 8,682,753 B2 | 3/2014 | Kulathungam |
| 8,682,802 B1 | 3/2014 | Kannanari |
| 8,700,729 B2 | 4/2014 | Dua |
| 8,706,625 B2 | 4/2014 | Vicente et al. |
| 8,712,839 B2 | 4/2014 | Steinert et al. |
| 8,725,601 B2 | 5/2014 | Ledbetter et al. |
| 8,762,211 B2 | 6/2014 | Killian et al. |
| 8,762,237 B2 | 6/2014 | Monasterio et al. |
| 8,768,838 B1 | 7/2014 | Hoffman |
| 8,781,882 B1 | 7/2014 | Arboletti et al. |
| 8,781,957 B2 | 7/2014 | Jackson et al. |
| 8,781,963 B1 | 7/2014 | Feng et al. |
| 8,793,190 B2 | 7/2014 | Johns et al. |
| 8,794,972 B2 | 8/2014 | Lopucki |
| 8,851,369 B2 | 10/2014 | Bishop et al. |
| 8,868,458 B1 | 10/2014 | Starbuck et al. |
| 8,868,666 B1 | 10/2014 | Hellwege et al. |
| 8,880,047 B2 | 11/2014 | Konicek et al. |
| 8,887,997 B2 | 11/2014 | Barret et al. |
| 8,910,304 B2 | 12/2014 | Tsujimoto |
| 8,924,288 B1 | 12/2014 | Easley et al. |
| 8,925,099 B1 | 12/2014 | Saxe et al. |
| 8,954,839 B2 | 2/2015 | Sharma et al. |
| 9,043,609 B2 | 5/2015 | Calman |
| 9,076,134 B2 | 7/2015 | Grovit et al. |

(56) References Cited

U.S. PATENT DOCUMENTS

| | | |
|---|---|---|
| 9,105,021 B2 | 8/2015 | Tobin |
| 9,195,984 B1 | 11/2015 | Spector et al. |
| 9,256,871 B2 | 2/2016 | Anderson et al. |
| 9,256,904 B1 | 2/2016 | Haller et al. |
| 9,305,155 B1 | 4/2016 | Vo et al. |
| 9,351,193 B2 | 5/2016 | Raleigh et al. |
| 9,372,849 B2 | 6/2016 | Gluck et al. |
| 9,390,417 B2 | 7/2016 | Song et al. |
| 9,396,491 B2 | 7/2016 | Isaacson et al. |
| 9,444,824 B1 | 9/2016 | Balazs et al. |
| 9,489,694 B2 | 11/2016 | Haller et al. |
| 9,514,456 B2 | 12/2016 | England et al. |
| 9,519,934 B2 | 12/2016 | Calman et al. |
| 9,524,525 B2 | 12/2016 | Manyam et al. |
| 9,558,478 B2 | 1/2017 | Zhao |
| 9,569,473 B1 | 2/2017 | Holenstein et al. |
| 9,569,766 B2 | 2/2017 | Kneen |
| 9,576,318 B2 | 2/2017 | Caldwell |
| 9,646,300 B1 | 5/2017 | Zhou et al. |
| 9,647,855 B2 | 5/2017 | Deibert et al. |
| 9,690,621 B2 | 6/2017 | Kim et al. |
| 9,699,610 B1 | 7/2017 | Chicoine et al. |
| 9,710,566 B2 | 7/2017 | Ainslie et al. |
| 9,740,543 B1 | 8/2017 | Savage et al. |
| 9,760,871 B1 | 9/2017 | Pourfallah et al. |
| 9,775,029 B2 | 9/2017 | Lopez |
| 9,792,636 B2 | 10/2017 | Milne |
| 9,792,648 B1 | 10/2017 | Haller et al. |
| 9,849,364 B2 | 12/2017 | Tran et al. |
| 9,852,484 B1 | 12/2017 | Fonts et al. |
| 9,853,959 B1 | 12/2017 | Kapczynski et al. |
| 9,858,405 B2 | 1/2018 | Ranadive et al. |
| 9,858,576 B2 | 1/2018 | Song et al. |
| 9,978,046 B2 | 5/2018 | Lefebvre et al. |
| 9,996,837 B2 | 6/2018 | Siddens et al. |
| 10,032,146 B2 | 7/2018 | Caldwell |
| 10,044,501 B1 | 8/2018 | Bradley et al. |
| 10,044,647 B1 | 8/2018 | Karp et al. |
| 10,050,779 B2 | 8/2018 | Alness et al. |
| 10,055,747 B1 | 8/2018 | Sherman et al. |
| 10,096,006 B2 | 10/2018 | Loevenguth et al. |
| 10,096,043 B2 | 10/2018 | Beck et al. |
| 10,097,356 B2 | 10/2018 | Zinder |
| 10,115,155 B1 | 10/2018 | Haller et al. |
| 10,152,756 B2 | 12/2018 | Isaacson et al. |
| 10,157,420 B2 | 12/2018 | Narayana et al. |
| 10,187,483 B2 | 1/2019 | Golub et al. |
| 10,204,327 B2 | 2/2019 | Katzin et al. |
| 10,216,548 B1 | 2/2019 | Zhang et al. |
| 10,250,453 B1 | 4/2019 | Singh et al. |
| 10,275,602 B2 | 4/2019 | Bjorn et al. |
| 10,282,741 B2 | 5/2019 | Yu et al. |
| 10,332,088 B2 | 6/2019 | Groarke |
| 10,359,915 B2 | 7/2019 | Asai |
| 10,373,129 B1 | 8/2019 | James et al. |
| 10,402,817 B1 | 9/2019 | Benkreira et al. |
| 10,402,818 B2 | 9/2019 | Zarakas et al. |
| 10,417,396 B2 | 9/2019 | Bawa et al. |
| 10,423,948 B1 | 9/2019 | Wilson et al. |
| 10,438,290 B1 | 10/2019 | Winklevoss et al. |
| 10,445,152 B1 | 10/2019 | Zhang et al. |
| 10,460,395 B2 | 10/2019 | Grassadonia |
| 10,521,798 B2 | 12/2019 | Song et al. |
| 10,592,882 B1 | 3/2020 | Viswanath et al. |
| 10,614,478 B1 | 4/2020 | Georgi |
| 10,650,448 B1 | 5/2020 | Haller et al. |
| 10,657,503 B1 | 5/2020 | Ebersole et al. |
| 10,673,862 B1 | 6/2020 | Threlkeld |
| 10,742,655 B2 | 8/2020 | Taylor et al. |
| 10,762,478 B1 | 9/2020 | Maeng |
| 10,867,298 B1 | 12/2020 | Duke et al. |
| 10,872,005 B1 | 12/2020 | Killis |
| 10,878,496 B1 | 12/2020 | Duong et al. |
| 10,936,711 B2 | 3/2021 | Jain et al. |
| 10,963,589 B1 | 3/2021 | Fakhraie et al. |
| 10,984,482 B1 | 4/2021 | Thangarajah et al. |
| 10,992,679 B1 | 4/2021 | Fakhraie et al. |
| 11,107,561 B2 | 8/2021 | Matthieu et al. |
| 11,144,903 B2 | 10/2021 | Ready et al. |
| 11,151,529 B1 | 10/2021 | Nolte et al. |
| 11,200,569 B1 | 12/2021 | James et al. |
| 11,227,064 B1 | 1/2022 | Fakhraie et al. |
| 11,386,223 B1 | 7/2022 | Fakhraie et al. |
| 11,507,935 B1 | 11/2022 | Ellis et al. |
| 2001/0001856 A1 | 5/2001 | Gould et al. |
| 2001/0032183 A1 | 10/2001 | Landry |
| 2001/0051920 A1 | 12/2001 | Joao et al. |
| 2001/0056398 A1 | 12/2001 | Scheirer |
| 2002/0016749 A1 | 2/2002 | Borecki et al. |
| 2002/0035539 A1 | 3/2002 | O'Connell |
| 2002/0038289 A1 | 3/2002 | Lawlor et al. |
| 2002/0062249 A1 | 5/2002 | Iannacci |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0055786 A1 | 3/2003 | Smith et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | McQuaide et al. |
| 2004/0054564 A1 | 3/2004 | Fonseca et al. |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0143632 A1 | 7/2004 | McCarty |
| 2004/0148259 A1 | 7/2004 | Reiners et al. |
| 2004/0178907 A1 | 9/2004 | Cordoba |
| 2004/0225606 A1 | 11/2004 | Nguyen et al. |
| 2004/0249710 A1 | 12/2004 | Smith et al. |
| 2004/0249753 A1 | 12/2004 | Blinn et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0027431 A1 | 2/2005 | Todoroki et al. |
| 2005/0039041 A1 | 2/2005 | Shaw et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0171898 A1 | 8/2005 | Bishop et al. |
| 2005/0199714 A1 | 9/2005 | Brandt et al. |
| 2005/0205662 A1 | 9/2005 | Nelson |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046742 A1 | 3/2006 | Zhang |
| 2006/0046745 A1 | 3/2006 | Davidson |
| 2006/0059110 A1 | 3/2006 | Madhok et al. |
| 2006/0178986 A1 | 8/2006 | Giordano et al. |
| 2006/0184456 A1 | 8/2006 | De Janasz |
| 2006/0190374 A1 | 8/2006 | Sher |
| 2006/0202012 A1 | 9/2006 | Grano et al. |
| 2006/0206912 A1 | 9/2006 | Klarfeld et al. |
| 2006/0211493 A1 | 9/2006 | Walker et al. |
| 2006/0235795 A1 | 10/2006 | Johnson et al. |
| 2006/0278698 A1 | 12/2006 | Lovett |
| 2007/0051797 A1 | 3/2007 | Randolph-Wall et al. |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0214030 A1 | 9/2007 | Shear et al. |
| 2007/0226086 A1 | 9/2007 | Bauman et al. |
| 2007/0255653 A1 | 11/2007 | Tumminaro et al. |
| 2007/0266257 A1 | 11/2007 | Camaisa et al. |
| 2008/0000052 A1 | 1/2008 | Hong et al. |
| 2008/0005037 A1 | 1/2008 | Hammad et al. |

(56) References Cited

U.S. PATENT DOCUMENTS

| | | |
|---|---|---|
| 2008/0017702 A1 | 1/2008 | Little et al. |
| 2008/0021787 A1 | 1/2008 | Mackouse |
| 2008/0029608 A1 | 2/2008 | Kellum et al. |
| 2008/0052226 A1 | 2/2008 | Agarwal et al. |
| 2008/0066185 A1 | 3/2008 | Lester et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0170156 A1 | 7/2008 | Kim |
| 2008/0191878 A1 | 8/2008 | Abraham |
| 2008/0208726 A1 | 8/2008 | Tsantes et al. |
| 2008/0226142 A1 | 9/2008 | Pennella et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2008/0319889 A1 | 12/2008 | Hammad et al. |
| 2009/0005269 A1 | 1/2009 | Martin et al. |
| 2009/0007231 A1 | 1/2009 | Kaiser et al. |
| 2009/0012898 A1 | 1/2009 | Sharma et al. |
| 2009/0055269 A1 | 2/2009 | Baron |
| 2009/0055642 A1 | 2/2009 | Myers et al. |
| 2009/0089113 A1 | 4/2009 | Rousso et al. |
| 2009/0112763 A1 | 4/2009 | Scipioni et al. |
| 2009/0132351 A1 | 5/2009 | Gibson |
| 2009/0164324 A1 | 6/2009 | Bishop et al. |
| 2009/0205014 A1 | 8/2009 | Doman et al. |
| 2009/0228381 A1 | 9/2009 | Mik et al. |
| 2009/0254447 A1 | 10/2009 | Blades |
| 2009/0254971 A1 | 10/2009 | Herz et al. |
| 2009/0287603 A1 | 11/2009 | Lamar et al. |
| 2009/0292599 A1 | 11/2009 | Rampell et al. |
| 2009/0319638 A1 | 12/2009 | Faith et al. |
| 2010/0036769 A1 | 2/2010 | Winters et al. |
| 2010/0036906 A1 | 2/2010 | Song et al. |
| 2010/0063906 A1 | 3/2010 | Nelsen et al. |
| 2010/0082445 A1 | 4/2010 | Hodge et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0199098 A1 | 8/2010 | King |
| 2010/0228671 A1 | 9/2010 | Patterson |
| 2010/0274691 A1 | 10/2010 | Hammad et al. |
| 2010/0276484 A1 | 11/2010 | Banerjee et al. |
| 2010/0312700 A1 | 12/2010 | Coulter et al. |
| 2010/0327056 A1 | 12/2010 | Yoshikawa et al. |
| 2011/0023129 A1 | 1/2011 | Vernal et al. |
| 2011/0035288 A1 | 2/2011 | Clyne |
| 2011/0035318 A1 | 2/2011 | Hargrove et al. |
| 2011/0035596 A1 | 2/2011 | Attia et al. |
| 2011/0078010 A1 | 3/2011 | Postrel |
| 2011/0106698 A1 | 5/2011 | Isaacson et al. |
| 2011/0162057 A1 | 6/2011 | Gottumukkala et al. |
| 2011/0172837 A1 | 7/2011 | Forbes, Jr. |
| 2011/0176010 A1 | 7/2011 | Houjou et al. |
| 2011/0178929 A1 | 7/2011 | Durkin et al. |
| 2011/0191177 A1 | 8/2011 | Blackhurst et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0247055 A1 | 10/2011 | Guo et al. |
| 2011/0276479 A1 | 11/2011 | Thomas |
| 2011/0307826 A1 | 12/2011 | Rivera et al. |
| 2011/0320246 A1 | 12/2011 | Tietzen et al. |
| 2012/0024946 A1 | 2/2012 | Tullis et al. |
| 2012/0030006 A1 | 2/2012 | Yoder et al. |
| 2012/0030109 A1 | 2/2012 | Dooley Maley et al. |
| 2012/0041881 A1 | 2/2012 | Basu et al. |
| 2012/0046994 A1 | 2/2012 | Reisman |
| 2012/0047072 A1 | 2/2012 | Larkin |
| 2012/0095819 A1 | 4/2012 | Li |
| 2012/0096534 A1 | 4/2012 | Boulos et al. |
| 2012/0099780 A1 | 4/2012 | Smith et al. |
| 2012/0101938 A1 | 4/2012 | Kasower |
| 2012/0117467 A1 | 5/2012 | Maloney et al. |
| 2012/0117476 A1 | 5/2012 | Siegrist et al. |
| 2012/0123841 A1 | 5/2012 | Taveau et al. |
| 2012/0123933 A1 | 5/2012 | Abel et al. |
| 2012/0124658 A1 | 5/2012 | Brudnicki et al. |
| 2012/0158590 A1 | 6/2012 | Salonen |
| 2012/0173387 A1 | 7/2012 | Talker et al. |
| 2012/0197691 A1 | 8/2012 | Grigg et al. |
| 2012/0214577 A1 | 8/2012 | Petersen et al. |
| 2012/0227094 A1 | 9/2012 | Begen et al. |
| 2012/0233013 A1 | 9/2012 | Smith |
| 2012/0239417 A1 | 9/2012 | Pourfallah et al. |
| 2012/0239479 A1 | 9/2012 | Amaro et al. |
| 2012/0239670 A1 | 9/2012 | Horn et al. |
| 2012/0240235 A1 | 9/2012 | Moore |
| 2012/0246122 A1 | 9/2012 | Short et al. |
| 2012/0253852 A1 | 10/2012 | Pourfallah et al. |
| 2012/0254038 A1 | 10/2012 | Mullen |
| 2012/0259782 A1 | 10/2012 | Hammad |
| 2012/0265682 A1 | 10/2012 | Menon |
| 2012/0265685 A1 | 10/2012 | Brudnicki et al. |
| 2012/0270522 A1 | 10/2012 | Laudermilch et al. |
| 2012/0296725 A1 | 11/2012 | Dessert et al. |
| 2012/0296831 A1 | 11/2012 | Carrott |
| 2012/0310760 A1 | 12/2012 | Phillips et al. |
| 2012/0317036 A1 | 12/2012 | Bower et al. |
| 2013/0006847 A1 | 1/2013 | Hammad et al. |
| 2013/0031006 A1 | 1/2013 | McCullagh et al. |
| 2013/0046607 A1 | 2/2013 | Granville, III |
| 2013/0046690 A1 | 2/2013 | Calman et al. |
| 2013/0055378 A1 | 2/2013 | Chang et al. |
| 2013/0073388 A1 | 3/2013 | Heath |
| 2013/0080219 A1 | 3/2013 | Royyuru et al. |
| 2013/0090998 A1 | 4/2013 | Shimogori |
| 2013/0091452 A1 | 4/2013 | Sorden et al. |
| 2013/0103391 A1 | 4/2013 | Millmore et al. |
| 2013/0117696 A1 | 5/2013 | Robertson et al. |
| 2013/0132854 A1 | 5/2013 | Raleigh et al. |
| 2013/0151405 A1 | 6/2013 | Head et al. |
| 2013/0159178 A1 | 6/2013 | Colon et al. |
| 2013/0166332 A1 | 6/2013 | Hammad |
| 2013/0173402 A1 | 7/2013 | Young et al. |
| 2013/0174244 A1 | 7/2013 | Taveau et al. |
| 2013/0191213 A1 | 7/2013 | Beck et al. |
| 2013/0204894 A1 | 8/2013 | Faith |
| 2013/0212666 A1 | 8/2013 | Mattsson et al. |
| 2013/0218649 A1 | 8/2013 | Beal |
| 2013/0218758 A1 | 8/2013 | Koenigsbrueck et al. |
| 2013/0226813 A1 | 8/2013 | Voltz |
| 2013/0240618 A1 | 9/2013 | Hall |
| 2013/0246258 A1 | 9/2013 | Dessert |
| 2013/0246272 A1 | 9/2013 | Kirsch |
| 2013/0254079 A1 | 9/2013 | Murali |
| 2013/0254115 A1 | 9/2013 | Pasa et al. |
| 2013/0282542 A1 | 10/2013 | White |
| 2013/0297400 A1 | 11/2013 | Nagarajan et al. |
| 2013/0301392 A1 | 11/2013 | Zhao |
| 2013/0317893 A1 | 11/2013 | Nelson et al. |
| 2013/0332256 A1 | 12/2013 | Faith et al. |
| 2013/0339124 A1 | 12/2013 | Postrel |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1 | 1/2014 | Shrivastava |
| 2014/0024354 A1 | 1/2014 | Haik et al. |
| 2014/0026193 A1* | 1/2014 | Saxman ............... H04L 63/0853 726/4 |
| 2014/0032410 A1 | 1/2014 | Georgiev et al. |
| 2014/0032419 A1 | 1/2014 | Anderson et al. |
| 2014/0032723 A1 | 1/2014 | Nema |
| 2014/0040134 A1* | 2/2014 | Ciurea ............... G06Q 20/383 705/44 |
| 2014/0040144 A1 | 2/2014 | Plomske et al. |
| 2014/0046827 A1 | 2/2014 | Hochstatter et al. |

(56) References Cited

U.S. PATENT DOCUMENTS

| | | |
|---|---|---|
| 2014/0053069 A1 | 2/2014 | Yan |
| 2014/0058912 A1 | 2/2014 | Bajaj |
| 2014/0067503 A1 | 3/2014 | Ebarle Grecsek et al. |
| 2014/0067683 A1 | 3/2014 | Varadarajan |
| 2014/0068030 A1 | 3/2014 | Chambers et al. |
| 2014/0076967 A1 | 3/2014 | Pushkin et al. |
| 2014/0081736 A1 | 3/2014 | Blackhurst et al. |
| 2014/0108140 A1 | 4/2014 | Crawford |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0114855 A1 | 4/2014 | Bajaj et al. |
| 2014/0122328 A1 | 5/2014 | Grigg |
| 2014/0123312 A1* | 5/2014 | Marcotte ............... G06F 21/33 726/28 |
| 2014/0129357 A1 | 5/2014 | Goodwin |
| 2014/0129448 A1 | 5/2014 | Aiglstorfer |
| 2014/0136419 A1* | 5/2014 | Kiyohara ......... G06Q 20/40145 705/67 |
| 2014/0143886 A1 | 5/2014 | Eversoll et al. |
| 2014/0149198 A1 | 5/2014 | Kim et al. |
| 2014/0149293 A1 | 5/2014 | Laracey |
| 2014/0149368 A1 | 5/2014 | Lee et al. |
| 2014/0162598 A1 | 6/2014 | Villa-Real |
| 2014/0164220 A1 | 6/2014 | Desai et al. |
| 2014/0172576 A1 | 6/2014 | Spears et al. |
| 2014/0172707 A1 | 6/2014 | Kuntagod et al. |
| 2014/0180826 A1 | 6/2014 | Boal |
| 2014/0180854 A1 | 6/2014 | Bryant, II |
| 2014/0198054 A1 | 7/2014 | Sharma et al. |
| 2014/0200957 A1 | 7/2014 | Biggs |
| 2014/0207672 A1 | 7/2014 | Kelley |
| 2014/0236792 A1 | 8/2014 | Pant et al. |
| 2014/0237236 A1* | 8/2014 | Kalinichenko ......... H04L 63/18 713/168 |
| 2014/0248852 A1 | 9/2014 | Raleigh et al. |
| 2014/0250002 A1 | 9/2014 | Isaacson et al. |
| 2014/0258104 A1 | 9/2014 | Harnisch |
| 2014/0258109 A1 | 9/2014 | Jiang et al. |
| 2014/0258110 A1 | 9/2014 | Davis et al. |
| 2014/0278538 A1 | 9/2014 | Smith et al. |
| 2014/0279309 A1 | 9/2014 | Cowen et al. |
| 2014/0279474 A1 | 9/2014 | Evans et al. |
| 2014/0279551 A1 | 9/2014 | Samid |
| 2014/0279559 A1 | 9/2014 | Smith et al. |
| 2014/0282852 A1 | 9/2014 | Vestevich |
| 2014/0297438 A1 | 10/2014 | Dua |
| 2014/0306833 A1 | 10/2014 | Ricci |
| 2014/0324527 A1 | 10/2014 | Kulkarni et al. |
| 2014/0337188 A1 | 11/2014 | Bennett et al. |
| 2014/0337215 A1 | 11/2014 | Howe |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0357233 A1 | 12/2014 | Maximo et al. |
| 2014/0365291 A1 | 12/2014 | Shvarts |
| 2014/0372308 A1 | 12/2014 | Sheets |
| 2014/0379575 A1 | 12/2014 | Rogan |
| 2015/0019443 A1 | 1/2015 | Sheets et al. |
| 2015/0019944 A1 | 1/2015 | Kalgi |
| 2015/0026026 A1 | 1/2015 | Calman et al. |
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1* | 1/2015 | Dill ...................... G06Q 20/385 705/44 |
| 2015/0039457 A1 | 2/2015 | Jacobs et al. |
| 2015/0039496 A1 | 2/2015 | Shuster |
| 2015/0046338 A1 | 2/2015 | Laxminarayanan et al. |
| 2015/0046339 A1* | 2/2015 | Wong ................... G06Q 20/322 705/44 |
| 2015/0066768 A1 | 3/2015 | Williamson et al. |
| 2015/0070132 A1 | 3/2015 | Candelore |
| 2015/0073989 A1 | 3/2015 | Green et al. |
| 2015/0079932 A1 | 3/2015 | Zelinka et al. |
| 2015/0081349 A1 | 3/2015 | Johndrow et al. |
| 2015/0082042 A1 | 3/2015 | Hoornaert et al. |
| 2015/0088633 A1 | 3/2015 | Salmon et al. |
| 2015/0088756 A1 | 3/2015 | Makhotin et al. |
| 2015/0095238 A1 | 4/2015 | Khan et al. |
| 2015/0095999 A1 | 4/2015 | Toth |
| 2015/0096039 A1 | 4/2015 | Mattsson et al. |
| 2015/0100477 A1 | 4/2015 | Salama et al. |
| 2015/0100495 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0128215 A1 | 5/2015 | Son et al. |
| 2015/0132984 A1 | 5/2015 | Kim et al. |
| 2015/0134700 A1 | 5/2015 | Macklem et al. |
| 2015/0142673 A1 | 5/2015 | Nelsen et al. |
| 2015/0149272 A1 | 5/2015 | Salmon et al. |
| 2015/0149357 A1 | 5/2015 | Ioannidis et al. |
| 2015/0154595 A1 | 6/2015 | Collinge et al. |
| 2015/0161643 A1 | 6/2015 | Randell et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193639 A1 | 7/2015 | Esposito et al. |
| 2015/0193764 A1 | 7/2015 | Haggerty et al. |
| 2015/0193866 A1 | 7/2015 | Van Heerden et al. |
| 2015/0199679 A1* | 7/2015 | Palanisamy .......... G06Q 20/385 705/67 |
| 2015/0199689 A1 | 7/2015 | Kumnick et al. |
| 2015/0200495 A1 | 7/2015 | Yu et al. |
| 2015/0213435 A1* | 7/2015 | Douglas ............. G06Q 20/3821 705/64 |
| 2015/0220917 A1 | 8/2015 | Aabye et al. |
| 2015/0220999 A1* | 8/2015 | Thornton ............ H04M 15/805 705/14.66 |
| 2015/0221149 A1 | 8/2015 | Main et al. |
| 2015/0229622 A1 | 8/2015 | Grigg et al. |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254638 A1 | 9/2015 | Bondesen et al. |
| 2015/0254646 A1 | 9/2015 | Harkey et al. |
| 2015/0254647 A1 | 9/2015 | Bondesen et al. |
| 2015/0254655 A1 | 9/2015 | Bondesen et al. |
| 2015/0254656 A1 | 9/2015 | Bondesen et al. |
| 2015/0262182 A1 | 9/2015 | Gervais et al. |
| 2015/0269566 A1 | 9/2015 | Gaddam et al. |
| 2015/0277712 A1 | 10/2015 | Ratcliffe et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0324592 A1* | 11/2015 | Dutta ................... G06F 21/602 713/165 |
| 2015/0332067 A1 | 11/2015 | Gorod |
| 2015/0339663 A1 | 11/2015 | Lopreiato et al. |
| 2015/0339664 A1 | 11/2015 | Wong et al. |
| 2015/0348083 A1 | 12/2015 | Brill et al. |
| 2015/0371221 A1 | 12/2015 | Wardman |
| 2015/0372999 A1 | 12/2015 | Pi-Sunyer |
| 2015/0379508 A1 | 12/2015 | Van |
| 2016/0004741 A1 | 1/2016 | Johnson et al. |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0034906 A1 | 2/2016 | Stopic et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0086222 A1 | 3/2016 | Kurapati |

(56) References Cited

U.S. PATENT DOCUMENTS

| | | |
|---|---|---|
| 2016/0092696 A1 | 3/2016 | Guglani et al. |
| 2016/0092870 A1* | 3/2016 | Salama ............... G06Q 20/3226 705/44 |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1* | 4/2016 | Laxminarayanan .. H04L 9/0822 713/168 |
| 2016/0125405 A1 | 5/2016 | Alterman et al. |
| 2016/0125409 A1 | 5/2016 | Meredith et al. |
| 2016/0127892 A1 | 5/2016 | Huang et al. |
| 2016/0132918 A1 | 5/2016 | Thomas |
| 2016/0140221 A1 | 5/2016 | Park et al. |
| 2016/0140541 A1 | 5/2016 | Pearson et al. |
| 2016/0149875 A1 | 5/2016 | Li et al. |
| 2016/0155156 A1 | 6/2016 | Gopal et al. |
| 2016/0171483 A1 | 6/2016 | Luoma et al. |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |
| 2016/0267467 A1 | 9/2016 | Rutherford et al. |
| 2016/0267480 A1 | 9/2016 | Metral |
| 2016/0292673 A1 | 10/2016 | Chandrasekaran |
| 2016/0294879 A1 | 10/2016 | Kirsch |
| 2016/0307229 A1 | 10/2016 | Balasubramanian et al. |
| 2016/0314458 A1 | 10/2016 | Douglas et al. |
| 2016/0321643 A1 | 11/2016 | Beck et al. |
| 2016/0321669 A1 | 11/2016 | Beck et al. |
| 2016/0328522 A1 | 11/2016 | Howley |
| 2016/0328577 A1 | 11/2016 | Howley |
| 2016/0358163 A1 | 12/2016 | Kumar et al. |
| 2016/0371471 A1 | 12/2016 | Patton et al. |
| 2016/0373458 A1 | 12/2016 | Moreton et al. |
| 2016/0379211 A1 | 12/2016 | Hoyos et al. |
| 2017/0004506 A1 | 1/2017 | Steinman et al. |
| 2017/0004590 A1 | 1/2017 | Gluhovsky |
| 2017/0011215 A1 | 1/2017 | Poiesz et al. |
| 2017/0011389 A1 | 1/2017 | McCandless et al. |
| 2017/0011450 A1 | 1/2017 | Frager et al. |
| 2017/0018029 A1 | 1/2017 | Eiriz et al. |
| 2017/0024393 A1 | 1/2017 | Choksi et al. |
| 2017/0046679 A1 | 2/2017 | Gotlieb et al. |
| 2017/0068954 A1 | 3/2017 | Hockey et al. |
| 2017/0070484 A1 | 3/2017 | Kruse et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0103388 A1 | 4/2017 | Pillai et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0161973 A1 | 6/2017 | Katta et al. |
| 2017/0201850 A1 | 7/2017 | Raleigh et al. |
| 2017/0237554 A1 | 8/2017 | Jacobs et al. |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2017/0366348 A1 | 12/2017 | Weimer |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0075440 A1 | 3/2018 | Beck et al. |
| 2018/0088909 A1 | 3/2018 | Baratta et al. |
| 2018/0096752 A1 | 4/2018 | Ovalle |
| 2018/0121913 A1 | 5/2018 | Unnerstall et al. |
| 2018/0137560 A1 | 5/2018 | Chopra et al. |
| 2018/0158137 A1 | 6/2018 | Tsantes et al. |
| 2018/0174148 A1 | 6/2018 | Selvarajan |
| 2018/0247302 A1 | 8/2018 | Armstrong et al. |
| 2018/0254898 A1 | 9/2018 | Sprague et al. |
| 2018/0268382 A1 | 9/2018 | Wasserman |
| 2018/0268408 A1 | 9/2018 | Botros et al. |
| 2018/0270363 A1 | 9/2018 | Guday et al. |
| 2018/0276628 A1 | 9/2018 | Radiotis et al. |
| 2018/0293554 A1 | 10/2018 | Johnson |
| 2018/0331835 A1 | 11/2018 | Jackson |
| 2018/0349922 A1 | 12/2018 | Carlson et al. |
| 2018/0357440 A1 | 12/2018 | Brady et al. |
| 2018/0365753 A1 | 12/2018 | Fredrich et al. |
| 2018/0373891 A1 | 12/2018 | Barday et al. |
| 2019/0007381 A1 | 1/2019 | Isaacson et al. |
| 2019/0095898 A1 | 3/2019 | Bhatia |
| 2019/0164221 A1 | 5/2019 | Hill et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0244214 A1 | 8/2019 | Flores et al. |
| 2019/0295069 A1 | 9/2019 | Pala et al. |
| 2019/0318122 A1 | 10/2019 | Hockey et al. |
| 2019/0318424 A1 | 10/2019 | McWilliams |
| 2019/0325161 A1 | 10/2019 | Zavesky et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1 | 11/2019 | Crawford |
| 2019/0356641 A1 | 11/2019 | Isaacson et al. |
| 2019/0362069 A1 | 11/2019 | Park et al. |
| 2019/0369845 A1 | 12/2019 | Rucker |
| 2019/0370798 A1 | 12/2019 | Hu et al. |
| 2019/0378182 A1 | 12/2019 | Weinflash et al. |
| 2019/0392443 A1 | 12/2019 | Piparsaniya et al. |
| 2020/0005283 A1 | 1/2020 | Zimmerman et al. |
| 2020/0005347 A1 | 1/2020 | Boal |
| 2020/0074552 A1 | 3/2020 | Shier et al. |
| 2020/0076601 A1 | 3/2020 | Jafari |
| 2020/0090179 A1 | 3/2020 | Song et al. |
| 2020/0118114 A1 | 4/2020 | Benkreira et al. |
| 2020/0118132 A1 | 4/2020 | Schmidt et al. |
| 2020/0118133 A1 | 4/2020 | Schmidt et al. |
| 2020/0286057 A1 | 9/2020 | Desai |
| 2020/0286076 A1 | 9/2020 | Zhu et al. |
| 2020/0380514 A1 | 12/2020 | Crofts |
| 2021/0012326 A1 | 1/2021 | Maxwell Zelocchi |
| 2021/0027300 A1 | 1/2021 | Chetia et al. |
| 2021/0035072 A1 | 2/2021 | Awasthi |
| 2021/0124760 A1 | 4/2021 | Klein et al. |
| 2021/0217002 A1 | 7/2021 | Basu et al. |
| 2021/0233170 A1 | 7/2021 | Cadet |
| 2021/0258169 A1 | 8/2021 | Basu et al. |
| 2021/0303335 A1 | 9/2021 | Foreman et al. |
| 2021/0350343 A1 | 11/2021 | Gaur et al. |
| 2021/0350458 A1 | 11/2021 | Gaur et al. |
| 2022/0029815 A1 | 1/2022 | Basu et al. |
| 2022/0292496 A1 | 9/2022 | Yan |
| 2022/0294630 A1 | 9/2022 | Collen |
| 2023/0036439 A1 | 2/2023 | Olson et al. |
| 2023/0070625 A1 | 3/2023 | Gaur et al. |
| 2023/0206329 A1 | 6/2023 | Cella et al. |
| 2023/0214925 A1 | 7/2023 | Cella et al. |
| 2024/0265405 A1 | 8/2024 | Kramme et al. |

FOREIGN PATENT DOCUMENTS

| | | |
|---|---|---|
| AU | 2011268420 A1 | 12/2012 |
| AU | 2015255170 A1 | 11/2015 |
| AU | 2016285320 A1 | 12/2017 |
| CA | 2369296 A1 | 10/2000 |
| CA | 2600101 A1 | 2/2008 |
| CA | 2751554 A1 | 8/2010 |
| CA | 2736690 A1 | 10/2011 |

(56) References Cited

FOREIGN PATENT DOCUMENTS

| | | |
|---|---|---|
| CA | 3014995 C | 8/2017 |
| CN | 1183841 A | 6/1998 |
| CN | 1353842 A | 6/2002 |
| CN | 101303717 A | 11/2008 |
| CN | 101303717 B | 11/2008 |
| CN | 102346896 A | 2/2012 |
| CN | 102498497 A | 6/2012 |
| CN | 102804219 A | 11/2012 |
| CN | 103635920 A | 3/2014 |
| CN | 103797500 A | 5/2014 |
| CN | 103843024 A | 6/2014 |
| CN | 104106276 B | 10/2014 |
| CN | 102648476 B | 3/2016 |
| CN | 107230049 A | 10/2017 |
| CN | 107230070 A | 10/2017 |
| CN | 103413231 B | 11/2017 |
| EP | 1 259 947 A2 | 11/2002 |
| EP | 1 770 628 A2 | 4/2007 |
| EP | 3 073 670 B1 | 9/2016 |
| GB | 0 441 156 | 1/1936 |
| GB | 2 441 156 A | 2/2008 |
| KR | 20160015375 A | 2/2016 |
| WO | WO-90/13096 A1 | 11/1990 |
| WO | WO-00/72245 A1 | 11/2000 |
| WO | WO-03/038551 A2 | 5/2003 |
| WO | WO-2004/081893 A1 | 9/2004 |
| WO | WO-2004/090825 A1 | 10/2004 |
| WO | WO-2005/116886 A2 | 12/2005 |
| WO | WO-2009/151839 A1 | 12/2009 |
| WO | WO-2011/017613 A2 | 2/2011 |
| WO | WO-2011/053404 A1 | 5/2011 |
| WO | WO-2012/054148 A1 | 4/2012 |
| WO | WO-2012/131430 A1 | 10/2012 |
| WO | WO-2012/150602 A1 | 11/2012 |
| WO | WO-2013/044175 A1 | 3/2013 |
| WO | WO-2013/075071 A1 | 5/2013 |
| WO | WO-2013/082190 A1 | 6/2013 |
| WO | WO-2015/036817 A1 | 3/2015 |
| WO | WO-2015/103443 A1 | 7/2015 |
| WO | WO-2015/135131 A1 | 9/2015 |
| WO | WO-2016/015054 A1 | 1/2016 |
| WO | WO-2016/025291 A1 | 2/2016 |
| WO | WO-2017/035399 A1 | 3/2017 |
| WO | WO-2018/005635 A1 | 1/2018 |
| WO | WO-2022/154789 A1 | 7/2022 |

OTHER PUBLICATIONS

Tene et al. Big Data for All: Privacy and User Control in the Age of Analytics. Northwestern Journal of technology and Intellectual Property. https://scholarlycommons.law.northwestern.edu/cgi/viewcontent.cgi?article=1191 &context=njtip (Year: 2013).
ASB, "How to command your cards with ASB Card Control" Apr. 20, 2015, https://www.youtube.com/watch?v=O1sfxvVUL74 (Year: 2015).
Austin Telco Federal Credit Union, "Lost or Stolen Cards", www.atfcu.org/lost-stolen-cards.htm; Apr. 9, 2004. 6 pages.
Authorize.Net. Authorize. Net Mobile Application: iOS User Guide. Sep. 2015. Authorize.Net LLC. Ver.2.0, 1-23. https://www.authorize.net/content/dam/anet-redesign/documents/iosuserguide.pdf(Year: 2015).
BancFirst, "Lost Card", https://www.bancfirst.com/contact.aspx, Oct. 28, 2003. 1 page.
CM/ECF, "CM/ECF Internet Credit Card Payment Guide", https://www.vaeb.uscourts.gov/wordpress/?page_id=340, Mar. 16, 2005. 12 pages.
Co-Op Think, Rachna Ahlawat at Co-Op Think—Evolution Sessions from THINK14, Dec. 22, 2014, 26:22. https://www.youtube.com/watch?v=yEp-qfZoPhl (Year: 2014).
Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.
Demiriz et al. "Using Location Aware Business Rules for Preventing Retail Banking Frauds" Jan. 15, 2015, IEEE (Year: 2015).
Diversinet enables new consumer mobile services from intersections inc.; MobiSecure wallet and vault helps identity management leader get closer to its customers. (May 30, 2007). PR Newswire Retrieved from https://dialog.proquest.com/professional/docview/450976918?accountid=131444 on Feb. 22, 2023 (Year: 2007).
Eickhoff et al: "Quality through Flow and Immersion: Gamifying Crowdsourced Relevance Assessments", Proceedings of the 35th international ACM SIGIR conference on Research and development in information retrieval, Aug. 12, 2012. (Year: 2012).
Fiserv. CardValet: Mobile Application Training. Fiserv, Inc. 1-93. https://www.westernbanks.com/media/1664/ cardvalet-application .pdf (Year: 2015).
Foreign Action other than Search Report on non-Foley case related to US Dtd Dec. 7, 2022.
Fort Knox Federal Credit Union, "Lost or Stolen VISA Card", http://www.fortknoxfcu.org/loststolen.html, Feb. 1, 2001. 2 pages.
Hinze et al.; Event-Based Applications and Enabling Technologies. https://www.researchgate.net/profile/Annika-Hinze/publication/220796268_Event-based_applications_and_enabling_technologies/Links/0fcfd 50b638d9592a1000000/Event-based-applications-and-enabling-technologies.pdf (Year: 2009).
IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).
IP.com Search Query; May 5, 2020 (Year: 2020).
Konsko: "Credit Card Tokenization: Here's What You Need to Know", Credit Card Basics, Credit Card—Advertisement Nerdwallet (Year: 2014).
Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.
Microsoft, "Automatically summarize a document", 2016. 3 pages.
Notre Dame FCU "Irish Card Shield: How to Control Transaction Types" Jan. 15, 2016, 0:27, https://youtube.com/watch?v=0eZG1c6Bn38 (Year: 2016).
Other USPTO Comm. with Refs. on US Dtd Nov. 22, 2023.
PCM Credit Union, "CardValet Tutorial" Jun. 24, 2015, https://www.youtube.com/watch?v=uGPh9Htw0Wc (Year: 2015).
Purchasing charges ahead. (1994). Electronic Buyers' News,, 68. Retrieved from https://dialog.proquest.com/professional/docview/681599288?accountid=131444 on Nov. 13, 2020 (Year: 1994).
RBC Royal Bank, "If Your Card is Lost or Stolen", http://www.rblbank.com/pdfs/CreditCard/FAQs.pdf, Oct. 1, 2002. 2 pages.
Smartphones as Practical and Secure Location Verification Tokens for Payments. file:///C:/Users/eoussir/Documents/e-Red% 20 Folder/15496961 /N Pl_ Smartphones %20as %20 Practical %20and %20Secu re %20 Location %20Verification %20Tokens %20for%20Payments.pdf (Year: 2014).
State Employees Credit Union, "Lost or Stolen Account Info", https://www.secumd.org/advice-planning/money-and-credit/privacy-fraud-protection/lost-or-stolen-account-info.aspx, May 20, 2005. 2 pages.
Transaction aggregation as a strategy for credit card fraud detection. file:///C:/Users/eoussir/Downloads/Transaction_aggregation_as_a_strategy for credit_c. pdf (Year: 2009).
Union Bank & Trust, "Report Lost or Stolen Card", http://www.ubt.com/security-fraud/report-lost-or-stolen-cards, Jul. 10, 2005. 13 pages.
Urein et al: "A breakthrough for prepaid payment: End to end token exchange and management using secure SSL channels created by EAP-TLS smart cards", 2011 International Conference on Collaboration Technologies and Systems (CTS) (Year: 2011).
Using location aware business rules for preventing retail banking frauds. https://ieeexplore.ieee.org/stamp/stamp.jsp?tp=&arnumber=7351936 (Year: 2015).
Yang MH. Security enhanced EMV-based mobile payment protocol. Scientific World Journal. 2014.https://www.ncbi.nlm.nih.gov/ pmc/articles/PMC4181509/ (Year: 2014).
Yang, Ming-Hour; Security Enhanced EMV-Based Mobile Payment Protocol. https://patents.google.com/scholar/15767854982483958498?q

(56) References Cited

OTHER PUBLICATIONS (Security Enhanced EMV-Based Mobile Payment Protocol)&patents=false&scholar&oq=Security Enhanced EMV-Based Mobile Payment Protocol (Year: 2014).

Demiriz et al., "Using location aware business rules for preventing retail banking frauds," 2015 First International Conference on Anti-Cybercrime (ICACC), pp. 1-6. https://ieeexplore.ieee.org/documenU7351936? source=IQplus.

Dunman et al., "A Novel and Successful Credit Card Fraud Detection System Implemented in a Turkish Bank," 2013 IEEE 13th International Conference on Data Mining Workshops, Dallas, TX, USA. Retrieved from https://ieeexplore.ieee.org/documenU6753916? source=IQplus.

Ivatury, G., Mobile Phone Banking and Low-Income Customers, 2006, Retrieved from https://www.cgap.org/sites/default/files/CGAP-Mobile-Phone-Banking-and-Low-Income-Customers-Evidence-from-South-Africa-Jan-2006.pdf.

Park et al., "Leveraging Cellular Infrastructure to Improve Fraud Prevention," 2009 Annual Computer Security Applications Conference, Honolulu, HI, USA, https://ieeexplore.ieee.org/documenU5380689?source= IQplus.

Trappey et al., "Patent portfolio analysis of e-payment services using technical ontology roadmaps," 2016 IEEE International Conference on Systems, Man, and Cybernetics (SMC), Budapest, Hungary. Retrieved from https://ieeexplore.ieee.org/documenU7844992? source=IQplus.

"Bitcoin Off-Chain Transactions: Their Invention and Use," by Michelle Mount. Geo. L. Tech. Rev. 4. 2020. pp. 685-698. (Year: 2020).

"The Bitcoin Lightening Network: Scalable Off-Chain Instant Payments," by Joseph Poon; and Thaddeus Dryia. Jan. 14, 2016. (Year: 2016).

Are Central Bank Digital Currencies (CBDCs) the money of tomorrow (Year: 2020).

NPL Search Terms (Year: 2024).

Shehnaz Ahmed, Private partners could help RBI run a digital currency. (Year: 2021).

Shiravale, et al., Blockchain Technology: A Novel Approach in Information Security Research, IEEE 2018 (Year: 2018), 4 pps.

Yang, et al., Impact of Bitcoin's Distributed Structure on the Construction of the Central Bank's Digital Currency System IEEE, 2020 (Year: 2020), 4 pps.

Luz et al: "A Mobile NFC Payment Terminal for the Event-Wallet on an Android Smartphone" researchgat.net, (Year: 2012).

"Location based bank card fraud prevention using push notification technology," 2015, IP.com No. IPCOM000244440D (8 pages).

Mampaey, M., "Secure remittance transaction to bankless consumers in a fragmented applications market," 2011, in Bell Labs Technical Journal, vol. 16, Issue 2, pp. 219-233.

Yang, MH., "Security enhanced EMV-based mobile payment protocol," 2014, Scientific World Journal, 19 Pages.

Liu et al "A Survey of Payment Card Industry Data Security Standard," IEEE Communications Surveys & Tutorials, vol. 12, No. 3, Third Quarter 2010, pp. 287-303 (Year: 2010).

\* cited by examiner

TOKEN MANAGEMENT SYSTEM

CROSS-REFERENCE TO RELATED APPLICATION

This application claims priority to and is a continuation of U.S. patent application Ser. No. 17/897,551, filed Aug. 29, 2023, which claims priority to and is a continuation of U.S. patent application Ser. No. 15/081,536 (now U.S. Pat. No. 11,429,975), filed Mar. 25, 2016, which claims priority to U.S. Provisional Patent Application No. 62/139,525, filed on Mar. 27, 2015, all of which are hereby incorporated by reference herein for any and all purposes.

BACKGROUND

The present disclosure relates generally to the field of tokenization. More particularly, the present disclosure relates to systems and methods for storing and managing electronic tokens.

Tokenization is often used to replace sensitive information with a non-sensitive equivalent having limited extrinsic value (i.e., an electronic token). The electronic token may then be resolved by a central entity in order to derive the sensitive information. For instance, an electronic token may be used in place of credit card information to initiate payment activity. A merchant receiving such an electronic payment token may provide the token to a central entity and receive account information for processing the payment based on the token. Along with providing improved security for electronic transactions, electronic tokens may also provide enhanced transaction efficiency, increase service transparency, and enable various third party payment methods.

Various financial networks utilize tokenization for card accounts to initiate secured payments via tokens. Upon issuing the token, the financial network may store the issued token and any associated card account information within a storage location (i.e., a token vault). However, the data structure for each storage location is not consistent and the functionality varies between financial networks. Thus, it may be difficult for the financial networks and associated financial institutions to access authorized information stored across multiple storage locations, such as to provision a token or perform token life cycle management actions. Further, storage locations supported by the financial networks may not support tokenization of non-card domains, such as demand deposit accounts (DDAs) or Automated Clearing House (ACH) transactions.

SUMMARY

One embodiment of the present disclosure relates to a computer system. The computer system includes a token repository configured to store payment tokens, and a server system. The server system includes a processor and instructions stored in non-transitory machine-readable media, the instructions configured to cause the server system to receive a request to provision a payment token based on a financial product, wherein the request includes information related to the financial product, provision a payment token based on the token request, including authenticating the financial product based on the financial product information and generating the payment token upon authenticating the financial product, wherein the payment token is useable to make a payment via the financial product, and store the payment token in the token repository.

Another embodiment of the present disclosure relates to a computer system. The computer system includes a token repository configured to store payment tokens, and a server system. The server system includes a processor and instructions stored in non-transitory machine-readable media, the instructions configured to cause the server system to receive information related to a payment token stored in the token repository, update the status of the stored payment token based on the information, and upon updating the status of the payment token, send a notification to a user of the payment token indicating that the status of the stored payment token has been updated.

Another embodiment of the present disclosure relates to a computer system. The computer system includes a token repository configured to store a payment token, and a server system. The server system includes a processor and instructions stored in non-transitory machine-readable media, the instructions configured to cause the server system to receive a request to authorize a transaction from a requesting entity, wherein the transaction was initiated based on the stored payment token, and wherein the payment token includes encrypted information related to a financial product, authorize the transaction based on the payment token and authorization rules stored in memory of the computer system, including de-tokenizing the payment token to identify the financial product information, and upon authorizing the transaction, send the financial product information to the requesting entity, wherein the financial product information is useable by the requesting party to process the transaction.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

DETAILED DESCRIPTION

Figure 1:
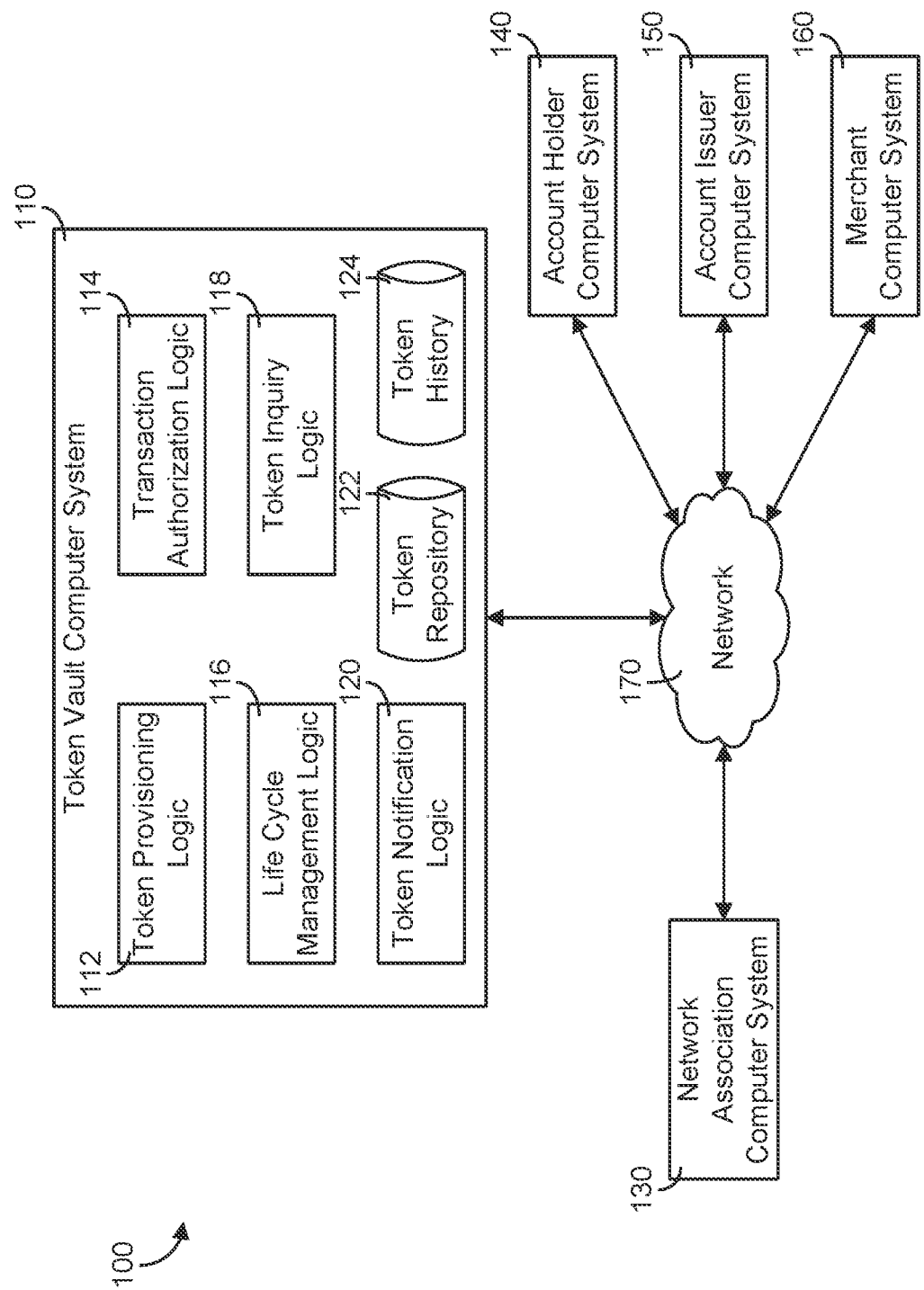
FIG. 1 is a schematic diagram of a token management system, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the Figures, a token management system is shown. The token management system includes a token vault computer system. The token vault computer system is configured to manage and store electronic tokens. The token vault computer system may also be configured to provision electronic tokens based on information provided to the token vault computer system. The token vault computer system may be configured to provision tokens (e.g., payment tokens) based on payment information (e.g., a personal account number, a credit card number, etc.) related to a customer financial product. Provisioning the payment token may include authenticating the associated financial product, determining eligibility of the financial product for tokenization, generating the token based on the provided payment information, and linking the generated token to the associated financial product. The token vault computer system may also be configured to provision tokens based on non-payment information, such as a customer address, social security number, date of birth, or any other information.

In example embodiments, the payment tokens may be utilized to facilitate payments to merchants. In example embodiments, payment tokens may be surrogate values that replace the primary account number (PAN) associated with a payment card, such as a credit card, debit card, stored value card, etc. Payment tokens may pass basic validation rules of an account number. Hence, the payment token for a credit card in many respects "looks like" a real credit card number, but in fact is only a token. As part of the token generation process, steps are taken such that the generated payment token does not have the same value as or conflict with a real primary account number (e.g., a real credit card number). Payment tokens may be provisioned to various locations for use in various types of payment scenarios, including remote storage at a merchant (e.g., a card-on-file database) for on-line transactions with the merchant, a secure storage element ("secure element") located in a payment card for a point-of-sale transaction using the payment card, local device storage (e.g., internal memory of a mobile device) for a mobile/digital wallet transaction, and so on.

In example embodiments, to process payment transactions, a payment is processed using a payment token in lieu of a primary account number (e.g., the 16-digit account number on the front of a credit card). The merchant obtains the payment token from a customer device or from the payment card, and then submits the payment token through a payment network to a computing system associated with a card network (e.g., Visa®, MasterCard®, American Express®, Discover®, Diners Club®, etc.). The card network computing system (e.g., network association computer system) de-tokenizes the payment token to obtain the PAN, i.e., replaces the payment token for its associated PAN value based on the payment token-to-PAN mapping information stored in a token database (sometimes referred to as a "token vault"). The card network computing system then transmits the PAN to the card issuer (e.g., the customer's financial institution) for processing in a manner similar to a traditional credit card transaction. For example, the card issuer may approve the transaction, in which case the transaction with the merchant is completed and payment to the merchant is made. The token database may also maintain other information that may be used to apply restrictions or other controls during transaction processing.

In example embodiments, processing payment transactions using such payment tokens provides enhanced security in connection with the payment card transactions. The payment tokens may be limited to use, e.g., only in connection with a specific merchant or a specific channel (e.g., payment via a specific mobile wallet). For example, in the event of a data breach at a merchant, the risk of subsequent fraud is reduced because only the payment tokens are exposed instead of primary account numbers. In this example, the payment tokens are merchant-specific and therefore cannot be used at other merchants. Although the examples provided herein relate primarily to the use of payment tokens (which may be used to originate payment transactions), the systems and methods described herein may also be used with non-payment tokens (which may be used for ancillary processes, such as loyalty tracking).

The token vault computer system may also be configured to manage the life cycle of each stored token. As part of the life cycle management, the token vault computer system may be configured to activate, de-activate, suspend, resume, and expire the stored token. The token vault computer system may also be configured to authorize a transaction using the token. The token vault computer system may authorize a transaction based on the token and other information related to an associated financial product. Once authorized, the token vault computer system may de-tokenize (e.g., resolve) the token and provide account information to the requesting party in order to process the transaction.

The token vault computer system may also include a token repository for storing the tokens. The token vault computer system may automatically store tokens generated by the token vault computer system in the token repository. The token vault computer system may also receive tokens that are generated by other entities and store the third party tokens in the token repository. The token vault computer system may convert the received third party tokens to a format similar to the generated payment tokens prior to storing the third party tokens in the token repository.

Referring to FIG. 1, token management system 100 is shown, according to an example embodiment. The token management system 100 may be used to manage electronic tokens. The electronic tokens may be or include unique identifiers that are intended to replace sensitive information. The information that is replaced by the token may include payment information related to a financial product (e.g., credit card, debit card, checking account, etc.), such as a card number, an account number, a primary account number (PAN), etc. Tokenized payment information (i.e., a payment token) may be used instead of the primary or original account information in order to initiate payment activity. The electronic tokens may also be used to replace sensitive non-payment information, such as a customer address or other personal information. The token management system 100 may be used to facilitate various services associated with the tokens, including provisioning (e.g., generating) a token, authorizing the token for use in a financial transaction, storing the token, and managing the life cycle of the token.

The token management system 100 may include, among other systems, a token vault computer system 110, a network association computer system 130, an account holder computer system 140, an account issuer computer system 150, and a merchant computer system 160. In one embodiment, the systems are each owned and operated by a separate entity. In other embodiments, two or more systems may be combined or two or more systems may be owned or operated by a single entity. The systems may communicate through network 170. The network 170 may be a single communication network configured to communicatively connect each of the systems, or the network 170 may include a plurality of networks each connecting two or more systems. The network 170 may include one or more of the Internet, a cellular network, Wi-Fi, Wi-Max, a proprietary banking network, or any other type of wired or wireless network.

The systems may each include a computer system (e.g., one or more servers each with one or more processing circuits), each of which include a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include data base components, object code components, script components, or any other type of information structure for supporting the various activities and information structures described herein. The memory may be communicably connected to the processor and include computer code or instructions for executing one or more processes described herein.

The token vault computer system 110 is configured to at least provision, store, and manage electronic tokens. The token vault computer system 110 may be provided by a financial institution, such as a bank offering a variety of financial accounts. In an example embodiment, the token vault computer system 110 is provided by the account issuer computer system 150. In some embodiments, the token vault computer system 110 is at least partially provided by the network association computer system 130, and any operations herein attributed to the token vault computer system 110 may be performed by the account issuer computer system 150 and/or network association computer system 130. The token vault computer system 110 may be configured to communicate with any of the network association computer system 130, account holder computer system 140, account issuer computer system 150, and merchant computer system 160, and may be configured to communicate with each of these systems via a separate and secure network.

It should be noted that the operations attributed to the token vault computer system 110, including the operations attributed to the token provisioning logic 112, transaction authorization logic 114, life cycle management logic 116, token inquiry logic 118, and token notification logic 120, may be performed by the network association computer system 130. including authenticating the token request, determining token eligibility, generating the token, providing terms and conditions for the token, assigning the token to an entity or financial product, and generating limited use keys for the token.

The token vault computer system 110 includes token provisioning logic 112, transaction authorization logic 114, life cycle management logic 116, token inquiry logic 118, and token notification logic 120. Such logic may be implemented in a machine (e.g., one or more networked computer servers) comprising machine-readable media having instructions stored therein which are executed by the machine to perform the operations described herein. For instance, such logic may be implemented and executed to manage electronic tokens as part of the token vault computer system 110. It should be noted that the token vault computer system 110 may be operated by the account issuer computer system 150. For instance, the account issuer computer system 150 may issue one or more financial accounts or products to an account holder, and the token vault computer system 110 may be operated by the account issuer computer system 150 and configured to manage various tokens related to those financial accounts. In other embodiments, the token vault computer system 110 may be operated separately from the account issuer computer system 150. In these embodiments, the token vault computer system 110 may be operated by a separate financial institution from the account holder and configured to provision and manage various tokens related to the financial accounts or products issued by the account issuer computer system 150.

The token provisioning logic 112 may be executed to provision a token. The token may be provisioned based on a tokenization request received at the token vault computer system 110. The tokenization request may be received from a user (i.e., an account holder, customer, etc.) of the token vault computer system 110, including via the account holder computer system 140. The tokenization request includes information that may be used to provision the token, including any data or information which is requested to be tokenized (i.e., replaced by a unique identifier). The token provisioning logic 112 is configured to tokenize payment information (i.e., account information for a financial product) and non-payment information (e.g., personal information, preferences, etc.). The tokenization request may also include information identifying the requestor or other information that may be used to authenticate the token.

The token provisioning logic 112 may provision a payment token based on payment information provided with the token request. The payment token may then be used in lieu of actual account information (i.e., information that has been tokenized) to initiate a payment from an associated financial product (e.g., credit card account, demand deposit account, line of credit, etc.). Provisioning a token based on payment information for a financial product may include authenticating the associated financial product, determining eligibility of the financial product and/or the token, generating the token, and linking the token to the financial product. The provisioned token may be intended to replace sensitive account information for the associated financial product, such as an account number, card number, or other identifying information. For instance, an account holder (i.e., the account holder computer system 140) may request a payment token from the token vault computer system 110 in order to make a payment using a customer financial product associated with the token vault computer system 110 (e.g., provided by the account issuer computer system 150).

The token provisioning logic 112 may also be configured to authenticate a tokenization request as part of the token provisioning, including authenticating an associated financial product (e.g., verifying that the financial product is associated with the account holder or other requesting party). In an example embodiment, the token vault computer system 110 receives a request from the account holder computer system 140 to provision a payment token associated with a financial product (e.g., credit card, debit card, checking account, etc.) of the account holder. In this embodiment, the token provisioning logic 112 is configured to authenticate the financial product prior to generating the payment token. The financial product may have been issued or provided by the token vault computer system 110, the account issuer computer system 150, or another financial entity. The tokenization request may include an original payment credential related to the financial product or other data that may be used by the token provisioning logic 112 to authenticate the product. The token provisioning logic 112 may also request additional information from the requesting party (e.g., the account holder) to authenticate the financial product. In other embodiments, the token provisioning logic 112 is configured to send communication to the issuer of the financial product (e.g., account issuer computer system 150) requesting an authentication confirmation. The token vault computer system 110 may also store authentication rules or other information that may be used by the token provisioning logic 112 to authenticate the financial product. Similarly, the token provisioning logic 112 may also authenticate the token requestor or any other associated entity, as well as any other (non-payment) information received as part of the request.

The token provisioning logic 112 may also be configured to determine token eligibility based on the token request, which may include whether a particular token is available for use. In an example embodiment, the provisioned token is intended to be a unique identifier for the tokenized information. In this embodiment, the token provisioning logic 112 may determine that a particular token is ineligible if an identical token has been used previously and/or if an identical token is currently active. The token provisioning logic 112 may then select a new unique identifier. The token provisioning logic 112 may also determine eligibility of the information for tokenization. For instance, the token provisioning logic 112 may determine whether a particular financial product can be tokenized to generate a payment token. For instance, the token provisioning logic 112 may be configured to determine the type of financial product (e.g., credit card, debit card, bank account, etc.) based on the request and determine token eligibility based on the type of financial product. Token eligibility may also be based on the issuing entity, the account holder, the requesting party, the type of transaction associated with a payment token, or other information that may be exchanged as part of a financial transaction. The token provisioning logic 112 may also request additional information from the requesting party in order to determine token eligibility.

In an example embodiment, the token vault computer system 110 stores eligibility rules for determining token eligibility, and the token provisioning logic 112 is configured to determine token eligibility based on the eligibility rules. The eligibility rules may be determined by the token vault computer system 110. The eligibility rules may also be determined by an issuer of a financial product, by a user providing the information, or another authorized party described herein. In other embodiments, the token provisioning logic 112 is configured to request confirmation of token eligibility from a separate entity. For instance, the token provisioning logic 112 may receive confirmation of token eligibility from the issuer of the financial product (e.g., the account issuer computer system 150).

Upon authenticating the information provided in the tokenization request and confirming token eligibility, the token provisioning logic 112 may be configured to generate the token. The token may be a unique identifier that replaces any sensitive or otherwise protected information with non-sensitive (e.g., non-financial) information. A payment token, for instance, is a non-financial identifier that replaces financial product information and may be used, pending activation, as a payment credential to initiate a payment using the financial product. The token may be unique to a particular requestor, token vault, financial product, token issuer, financial product issuer, account holder, and/or transaction. In an example embodiment, a payment token is generated based on a financial product such that the payment token does not have the same value as and does not otherwise conflict with the primary account number (PAN) associated with the financial product, or the PAN of another account holder. In some embodiments, the generated payment token is useable on a mobile device (e.g., tablet, cellular phone, smart watch, etc.) to make a payment. For instance, the payment token may be generated for use within a mobile wallet associated with one or more financial products. In these embodiments, the payment token may also be unique to the mobile device, such that a payment token is generated per card, per device, and per requestor (e.g., account holder).

The token generated by the token provisioning logic 112 may be any type of token, code, or other identifier that may be exchanged between two or more parties in order to securely transmit sensitive information. The token may be generated based on the particular requirements of the token, which may be provided by any of the parties described herein, including the token requestor. A payment token, for instance, may be a code or other identifier suitable for use as a payment credential, such as a numerical code, a barcode, a quick response (QR) code, or an RF signal. The token provisioning logic 112 may include one or more tokenization algorithms configured to generate the payment token. In an example embodiment, the payment token is a tokenized sixteen digit number. For instance, where the financial product is a credit or debit card account, the tokenized sixteen digit number may be used as a payment credential in place of the original sixteen digit number of the credit or debit card.

In one embodiment, the payment token has a unique BIN (e.g., the first four digits of the original card number), but retains the same last four digits as the original card number in order to accurately match the payment token to the account holder (i.e., the product owner). In this embodiment, the remaining numbers may be generated by the token provisioning logic 112 using various tokenization algorithms. In another embodiment, the payment token is a surrogate value for a PAN that is consistent with ISO 8583 message requirements. In this embodiment, the payment token may be a 13 to 19-digit numeric value that is compliant with basic validation rules of an account number.

The token provisioning logic 112 may also be configured to provide (e.g., retrieve) any terms and conditions associated with a generated token in response to a tokenization request. The terms and conditions may be provided to the token requestor. The token vault computer system 110 may require the requestor to consent to the terms and conditions prior to generating the payment token. The terms and conditions may be stored at the token vault computer system 110, such as being stored in the token history 124 or other memory of the token vault computer system 110. The terms and conditions may provide how a payment token may be used, for instance, such as by specifying a type or number of transactions allowed, a preferred method of payment, an expiration date for the token, or any other use restrictions. The token provisioning logic 112 may also be configured to provide graphics associated with the payment token based on the tokenization request.

The token provisioning logic 112 may also be configured to link (i.e., assign) a generated token to a particular entity or financial product. For instance, a payment token may be linked to an associated financial product such that the payment token may be re-used in a future transaction to make a payment using the same financial product. The payment token may also be linked to the financial product such that the financial product and/or the account holder must be authenticated in order to use the payment token in a transaction. The payment token may also be linked to any of the token requestor, an account holder, an associated merchant, a financial institution, or any other entity or product described herein.

The token provisioning logic 112 may also be configured to generate limited use keys (LUKs) as part of the token provisioning. For instance, the token provisioning logic 112 may generate an LUK based on the tokenization request. LUKs are payment tokens that are available for a limited use. The LUKs generated by the token provisioning logic 112 may be derived from or based on a master domain key (e.g., the payment token) that is associated with the financial product. The LUKs may be generated such that they expire or become unusable based on determined thresholds. For instance, each LUK may have a time to live (TTL) before the LUK expires and can no longer be used as a payment credential. The LUKs may also be set to expire based on a threshold transaction velocity (i.e., speed by which funds are transmitted) or a threshold number of transactions. The token vault computer system 110 may be configured to determine these thresholds based on any number of factors, including the financial product and the account holder. The token vault computer system 110 may also be configured to refresh or replenish any expired LUKs as may be necessary or desired.

In an example embodiment, the financial product relates to a payment card having The transaction authorization logic 114 may be executed to authorize a transaction in which a token is used. For instance, the token vault computer system 110 may receive a payment token from a recipient of the payment token such as merchant computer system 160 in order to validate the payment token and provide payment details based on the payment token. In particular, the transaction authorization logic 114 is configured to validate the payment token based on authorization rules. For instance, the transaction authorization logic 114 may validate that the payment token was generated by the token vault computer system 110 (i.e., the token provisioning logic 112) or another issuing entity (e.g., account issuer computer system 150). The transaction authorization logic 114 may also validate the payment token by verifying that the payment token was received from the account holder computer system 140 or another entity to which the payment token was issued by the token vault computer system 110. The transaction authorization logic 114 may also validate a token based on information received with the token. For instance, the transaction authorization logic 114 may validate the token by matching a passkey (or other information) that is received with the token to similar information stored at the token vault computer system 110 and associated with the token.

The authorization rules used by the transaction authorization logic 114 may be included as part of the transaction authorization logic 114 or stored in the token vault computer system 110 (e.g., in token history 124) and retrieved by the transaction authorization logic 114 to validate the payment token and authorize the transaction. The authorization rules may be determined by the token vault computer system 110. For instance, the authorization rules may be generated based on the payment token by the token provisioning logic 112 when the payment token is generated. The authorization rules may also be based on the financial product, the account holder, or any other information related to the payment token and described herein. The authorization rules may also be received and stored by the token vault computer system 110 from another entity, such as the issuer of the financial product where the issuer is an entity other than the token vault computer system 110. For instance, the transaction authorization logic 114 may be configured to request the authorization rules from an issuing entity upon receiving the payment token from a party requesting authorization.

The transaction authorization logic 114 may be configured to de-tokenize a payment token during authorization of the transaction. For instance, the transaction authorization logic 114 may de-tokenize the payment token to determine a primary account number (PAN) or other original account information upon validating the payment token. The transaction authorization logic 114 may then provide the de-tokenized original account information to the entity requesting the authorization, such as the merchant computer system 160 or the network association computer system 130, so that the requesting entity may proceed with processing the transaction. The transaction authorization logic 114 may be configured to encrypt the original account information prior to prevent unwanted use of the original account information. In other embodiments, such as where the token vault computer system 110 is the issuer of the financial product, the token vault computer system 110 may process the transaction based on the original account information derived from the payment token.

The life cycle management logic 116 may be executed to perform various actions related to the life cycle of the token. The actions may transition the token through various states of the token life cycle. For instance, the life cycle management logic 116 may be configured to activate, de-activate, suspend, resume, update, or expire the token once the token is provisioned. The life cycle management logic 116 may be configured to perform any of these actions in response to a request from the token requestor or the owner of the token (i.e., an account holder), or a party to the transaction having the necessary authorization. When the token is updated or a life cycle action is performed in response to a request, the life cycle management logic 116 may be configured to send confirmation of the update to the party requesting the update. The life cycle management logic 116 may also be configured to automatically perform any of the actions described herein, such as in response to another event or action. The life cycle management logic 116 is configured to send a notification to the token requestor (e.g., the account holder) when the payment token is updated or a life cycle action is performed based on a non-request action or event. The token may be stored in the token repository 122 and all actions performed by the life cycle management logic 116 may be performed at the token repository 122. All actions performed by the life cycle management logic 116 and all changes to the token may be recorded and stored at the token history 124.

The life cycle management logic 116 may also be configured to activate the token. The token vault computer system 110 may be configured to provide token-related information in exchange for the activated token. For instance, once provisioned, a payment token may require activation so that the payment token is useable to make a payment. The token vault computer system 110 may accept the activated payment token in exchange for payment information required to process a payment. In some embodiments, the token may also be automatically activated by the token provisioning logic 112 upon provisioning the token. Once the payment token is activated, the life cycle management logic 116 may also be configured to de-activate the payment token such that the payment token is no longer useable for making a payment. A token may be permanently or temporarily de-activated. When the token is de-activated, the token may not be useable to receive token-related information from the token vault computer system 110. For instance, the life cycle management logic 116 may be used to temporarily de-activate (i.e., suspend) a token. The life cycle management logic 116 is also configured to re-activate (i.e., resume) a suspended token. When re-activated, a payment token, for instance, is again active and may be used to make a payment. The life cycle management logic 116 is also configured to expire the token. The token may be expired based on various event or time-based thresholds, such as a number of uses, or a time since provisioning or after first use. The token may be expired based on a preference of the account holder, for instance. When the token is expired, the life cycle management logic 116 may renew the payment token or the payment token may be de-activated.

The life cycle management logic 116 is also configured to update the token, which may include updating any information associated with the token. For instance, the life cycle management logic 116 may be configured to update a payment token by updating the payment information on which the payment token is based. The payment token may also be updated to be associated with a new or additional financial product. Updating the token may also include replacing the token with a new token. For instance, the token may be updated with a new token after each use (e.g., after a payment is made using a payment token, after information is provided). Updating the payment token may also include updating the token expiration date. The life cycle management logic 116 may be configured to update the expiration date of the payment token based on use of the payment token or another event. Updating the payment token may also include performing any of the actions described herein in relation to the life cycle management logic 116.

The token inquiry logic 118 may be executed to process an inquiry related to the payment token. The token inquiry logic 118 is configured to provide an appropriate response to the inquiry. The inquiry may be received at the token vault computer system 110 from any of the network association computer system 130, the account holder computer system 140, the account issuer computer system 150, and the merchant computer system 160, any of which may be the token requestor or a holder of the payment token. The inquiry may be related to the current state of the payment token (e.g., active, expired, suspended, etc.). The inquiry may be related to a specific payment token or the inquiry may be a batch based on at least one of an account number or financial product (e.g., PAN), a token (e.g., TPAN), or an associated device. A batch inquiry may return information for each payment token having the provided characteristics. The token inquiry logic 118 is configured to receive the inquiry and search the token repository 122 for relevant payment tokens based on the inquiry. The token inquiry logic 118 then sends information related to the selected payment tokens (e.g., a current state) to the requesting party in response to the inquiry. The token inquiry logic 118 may request authenticating information from the requesting party prior to processing the inquiry. The token inquiry logic 118 may validate or authenticate the request based on information within the relevant payment token(s). In some embodiments, all actions described in relation to the token inquiry logic 118 may otherwise be performed, in whole or in part, by the token provisioning logic 112 and/or the life cycle management logic 116.

The token notification logic 120 may be executed to provide a notification related to a payment token. The token notification logic 120 may be configured to provide the same information as described in relation to the token inquiry logic 118, but the token notification logic 120 may provide the information in response to an action or event rather than a request. For instance, when the life cycle management logic 116 de-activates a payment token, the token notification logic 120 may send a notification to a relevant entity (e.g., a token requestor, an account holder, etc.) notifying the entity that the status of the payment token has changed. The token notification logic 120 may receive confirmation from the notified entity that the notification has been received. Any information related to the token notification logic 120 may be stored in the token history 124.

The token vault computer system 110 also includes token repository 122. The token repository 122 may include a storage system or other memory configured to receive and store payment tokens. Once a payment token is provisioned, the payment token may be stored in the token repository 122. The token repository 122 may be held by a financial institution and configured to store all payment tokens associated with the financial institution. In an example embodiment, the same financial institution provides the token vault computer system 110, including the logic described above, as well as the token repository 122 and the token history 124. The same financial institution may provide the financial product associated with the payment tokens stored in the repository 122.

The token repository 122 may be configured to store each payment token throughout the life cycle of the payment token. The payment tokens stored in the repository 122 may be generated by the token vault computer system 110 or generated elsewhere and converted by the token vault computer system 110 to match one or more characteristics of the generated payment tokens (i.e., payment tokens generated by the token provisioning logic 112). For instance, payment tokens that are not generated by the token vault computer system 110 may be converted such that all payment tokens stored within the repository 122 may be similarly searched (e.g., by token inquiry logic 118) in response to an inquiry.

The token vault computer system 110 also includes token history 124. The token history 124 includes memory configured to store information related to the payment tokens held by the token repository 122. The token history 124 may be stored in the token repository 122. The token history 124 includes a history of actions that are related to any payment tokens that have been stored in the token repository 122 or provisioned by the token provisioning logic 112. For instance, the token history 124 may include life cycle information for each of the stored payment tokens. The token history 124 may be used for responding to an inquiry, such as to determine a current state of a particular payment token. The token history 124 may also be utilized by the token provisioning logic 112 in generating a payment token. For instance, the token provisioning logic 112 may determine whether a particular payment token is unique based on information found within the token history 124.

Figure 2:
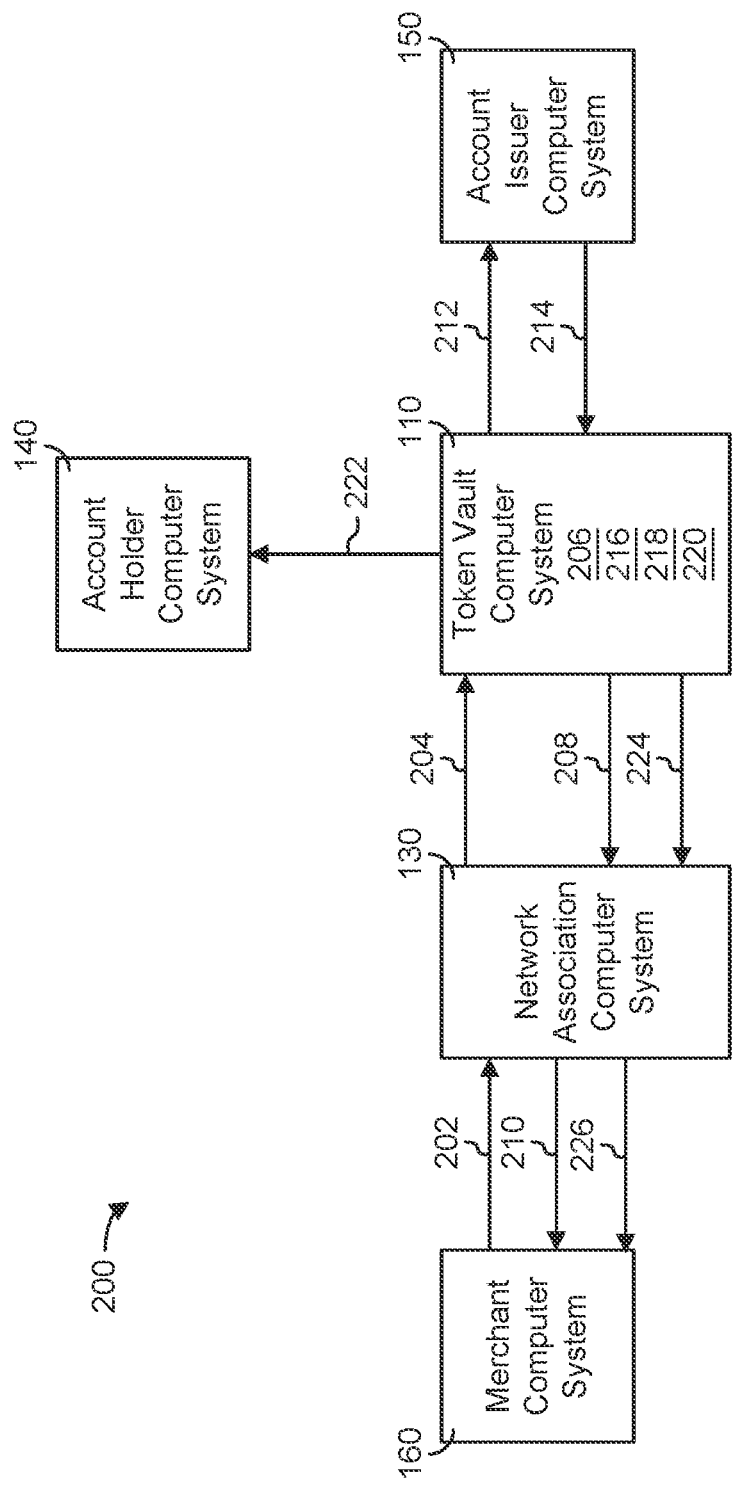
FIG. 2 is a schematic diagram of a token provisioning process that may be implemented using the system shown in FIG. 1.

Referring now to FIG. 2, a process 200 is shown for provisioning a token, according to an example embodiment. The process 200 may be performed using the token vault computer system 110 shown in FIG. 1. In particular, the process 200 may be performed using the token provisioning logic 112 of the token vault computer system 110, which is described in further detail herein. The process 200 may include authenticating the tokenization request, including a financial product to be associated with the token, determining token eligibility, generating the token, and/or linking the token to a financial product for future use. The process 200 may also include activating the token for use as part of a transaction and storing the token in the token repository 122. The process 200 is shown in FIG. 2 and described below as being used to provision a payment token based on payment information related to a financial product. However, the process 200 may also be used to provision a token based on other information that is received with a tokenization request, including non-payment information such as a customer shipping address, a social security number or other personal identifier, and other sensitive information that may be required to be securely exchanged between two or more parties.

At 202, a token requestor sends a request for a payment token to be provisioned based on a financial product. The token request may also include a request for terms and conditions related to the payment token and visual graphics for reading or displaying the payment token. The token request may include additional information that may be used to provision the payment token. The additional information may include identifying information that may be used to authenticate any of the requesting device, the token requestor, the account holder, and the financial product. In an example embodiment, the token request includes at least identifying information for the token requestor (e.g., a requestor ID) and a requesting device (i.e., device information). The token request may also any other information that is necessary or useful to provision the payment token, including to authenticate the token request and generate the payment token based on the financial product.

In an example embodiment, the token requestor is a merchant such as the merchant computer system 160. For instance, the merchant computer system 160 may send the request for the payment token in response to an account holder (i.e., the account holder computer system 140) initiating an online transaction with the merchant computer system 160. The merchant computer system 160 may receive identifying information from an account holder (i.e., user of the financial product) and send the identifying information with the token request for use in provisioning the payment token. The merchant computer system 160 may then receive the payment token based on the financial product and process the transaction without receiving sensitive account information from the account holder. In other embodiments, the token requestor may be the account holder computer system 140, the account issuer computer system 150, the network association computer system 130, or another entity related to the financial product or an associated transaction. In one embodiment, the token requestor may be a mobile wallet stored on a mobile device of the account holder. When the account holder (i.e., the user of the mobile device) adds a financial product to the mobile wallet or initiates a payment using the mobile wallet, the mobile device may send a token request to provision a payment token based on the financial product. The payment token may then be used by the mobile device to make a payment using the mobile wallet.

In the example embodiment, the token request is sent to the network association computer system 130. The network association computer system 130 may be provided by a network association (e.g., card association), which may be a network of issuing banks and acquiring banks that process payment cards of a specific brand. In the example embodiment, the network association computer system 130 is associated with the financial product being tokenized. For instance, the financial product may be a type of payment card that is processed by the network association. The token requestor may identify the network association and send the token request to the network association computer system 130 based on the financial product. In other embodiments, such as when the financial product is not associated with a particular network association, the token requestor may send the token request directly to the token vault computer system 110 to provision the payment token.

At 204, the network association computer system 130 sends the token request to the token vault computer system 110. The token request may be sent to the token vault computer system 110 based on the financial product. For instance, the token vault computer system 110 may be provided by a financial institution that provides the financial product associated with the token request. The token request may also be sent to the token vault computer system 110 based on the account holder. For instance, the account holder of the financial product may be a customer of the financial institution providing the token vault computer system 110. The account holder may also have other payment tokens stored at the token vault computer system 110.

At 206, the token vault computer system 110 (i.e., the token provisioning logic 112) determines the terms and conditions and the graphics associated with the payment token. The terms and conditions may specify how the payment token may be used to make a payment, storage procedures and security measures associated with the payment token, an expiration period for the payment token, and other terms and conditions that may be provided to the token requestor prior to or upon providing the generated payment token. The terms and conditions may be defined at the token vault computer system 110, such as by the token provisioning logic 112. The terms and conditions may be defined based on the financial product or based on any other information provided along with the token request.

The graphics associated with the payment token may include information related to how the payment token will be displayed. For instance, the payment token may be displayable (e.g., via a mobile device) in order to scan the payment token at a merchant point of sale device and initiate a payment. The graphics information may specify a mode of display for the payment token and may also include data or software required to display or otherwise manipulate the payment token. Similar to the terms and conditions, the graphics configuration may be defined at the token vault computer system 110, such as by the token provisioning logic 112.

At 208, the terms and conditions and graphics information are sent by the token vault computer system 110 to the network association computer system 130. At 210, the terms and conditions and graphics information are sent by the network association computer system 130 to the token requestor (i.e., the merchant computer system 160). In other embodiments, the terms and conditions and graphics information may be sent from the token vault computer system 110 directly to the token requestor. In an example embodiment, the terms and conditions for the payment token are provided to the token requestor prior to generating or providing the payment token. In this embodiment, the token requestor may be required to accept the associated terms and conditions prior to the payment token being generated or provided to the token requestor. The graphics information may also be provided to the token requestor prior to generating the payment token so that the token requestor may first confirm the ability to display the payment token having the provided graphics configuration. In other embodiments, the terms and conditions and graphics information may be provided upon providing the payment token to the token requestor.

At 212, the token vault computer system 110 (i.e., the token provisioning logic 112) determines token eligibility, which may include eligibility of the financial product for tokenization. The token vault computer system 110 may also authenticate the financial product. The token vault computer system 110 may determine eligibility of the token based on tokens that have been provisioned or are currently active. The token vault computer system 110 determines eligibility of the financial product for tokenization based on eligibility rules, which may be stored at the token vault computer system 110 (e.g., token repository 122, token history 124). The eligibility rules may be based on the particular financial product, the account holder, the token requestor, an expected use of the payment token, or any other information received as part of the token request or otherwise known. The eligibility rules may include a table that includes all financial products issued and associated with the token vault computer system 110. The table may provide an indication of whether a particular financial product is eligible for tokenization. The token provisioning logic 112 may be configured to determine eligibility by searching the table for the selected financial product based on any identifying information provided within the token request.

The token vault computer system 110 may also determine the eligibility of the financial product for tokenization by sending a request to the account issuer computer system 150. In an example embodiment, the request for an eligibility determination is sent to the account issuer computer system 150 at 212. In this embodiment, the account issuer computer system 150 may be the issuer of the financial product and may store eligibility rules specifying which of the financial products issued by the account issuer computer system 150 are eligible for tokenization. At 214, the account issuer computer system 150 may provide a determination of eligibility to the token vault computer system 110.

The token vault computer system 110 may also authenticate the payment token at 212. For instance, the token request may include an original payment credential related to the financial product or other data that may be used by the token provisioning logic 112 to authenticate the product. The token provisioning logic 112 may also request additional information from the token requestor to authenticate the financial product. In an example embodiment, the token vault computer system 110 stores authentication rules or other information that may be used to authenticate the financial product. In other embodiments, the token provisioning logic 112 is configured to send identifying information from the token request to the issuer of the financial product (e.g., account issuer computer system 150) and receive an authentication confirmation in response.

At 216, the token vault computer system 110 (i.e., token provisioning logic 112) is configured to filter the information within the token request. For instance, in some embodiments the payment token may include the name of a requesting device or a device storing an associated mobile wallet. The name may be encrypted within the payment token when the payment token is generated. In these embodiments, the token vault computer system 110 may be configured to filter any offensive words or characters from the device name so that the offensive characters are not received or interpreted by an entity receiving the payment token. The token vault computer system 110 may also be configured to filter any other offensive terms or characters that are to be included within the payment token. The filter settings may be determined by the token vault computer system 110 based on stored settings. The filter settings may also be determined based on inputs received from any of the entities in system 100. For instance, the merchant computer system 160 or the network association computer system 130 may specify any words or characters that should be filtered from the payment token.

At 218, the token vault computer system 110 (i.e., token provisioning logic 112) is configured to generate the payment token. The payment token may be generated after authenticating the financial product and determining that the financial product is eligible for tokenization. The payment token may be generated according to any coding convention described herein. The payment token may include any of the information described herein and related to the financial product, including any information received in the token request. Any information stored within the payment token may be encrypted by the token provisioning logic 112. The token requestor or another entity authorized to receive the encrypted information may be provided with a key or other information for decrypting the encrypted information. In one embodiment, the token provisioning logic 112 is also configured to activate the payment token upon generating the payment token.

At 220, the token vault computer system 110 may also be configured to generate limited use keys (LUKs). The token provisioning logic 112 may be configured to generate one or more LUKs based on the token request. The LUKs may be generated such that they expire or become unusable based on determined thresholds. For instance, each LUK may be configured to expire based on a set time period for expiration or based on a threshold transaction velocity (i.e., speed by which funds are transmitted) or number of transactions. The token vault computer system 110 may be configured to determine these thresholds based on any number of factors, including based on the financial product, the account issuer, the account holder, and an expected use for the payment token. The token vault computer system 110 may store settings, including expiration thresholds, for the LUKs at the token repository 122 and/or the token history 124.

At 222, the token vault computer system 110 (i.e., the token provisioning logic 112) may provide a notification to the account holder computer system 140. The notification may include information related to the payment token, such as any information found within the token request. The notification may also provide information related to generation of the payment token, including when the payment token was generated and/or activated, the associated financial product, the token requestor, the terms and conditions, any eligibility determination or authentication performed for the payment token, any LUKs that were generated based on the payment token or the token request, or any other information received or generated by the token vault computer system 110. The token provisioning logic 112 may provide the notification to the account holder computer system 140 and require confirmation by the account holder (i.e., system 140) prior to generating the payment token. The token provisioning logic 112 may also provide the notification when the payment token is generated and/or sent to another entity. In one embodiment, the same notification may be provided by the token notification logic 120.

At 224, the token vault computer system 110 may send the generated payment token to the network association computer system 130 (e.g., if the payment token is not generated by the system 130). However, in embodiments in which the network association computer system 130 generates the payment token, step 224 is not required. At 226, the network association computer system 130 sends the payment token to the token requester (i.e., the merchant computer system 160). In other embodiments, the token vault computer system 110 may send the generated payment token directly to the token requestor. Along with the payment token, the token vault computer system 110 may also send any associated terms and conditions, any graphics information for reading or displaying the payment token, and any LUKs that were generated with the payment token. In an example embodiment, the payment token has been activated and is available for use in making a payment.

As referenced above, the process 200 may also be utilized to provision a token based on non-payment information (e.g., to tokenize non-payment information). Any description herein related to the provisioning of payment tokens may be applied accordingly to the provisioning of tokens for non-payment information (i.e., non-payment tokens). Payment information may refer to information that may be used to initiate a process a payment, such as an account number, a card number, a routing number, and the like. Non-payment information refers to any information that is not payment information, and may particularly include personal information of an account holder such as address information (e.g., a shipping address for purchases), personal identification numbers (e.g., social security number, driver's license number, etc.), and other personal identifying information.

The token provisioning logic 112 and the process 200 may be utilized to provision a token based on any non-payment information so that the non-payment information may be securely transmitted between two or more parties. For instance, an account holder (i.e., the account holder computer system 140) may store at the token vault computer system 110 one or more non-payment tokens based on various non-payment information. The account holder may then provide the one of the non-payment tokens to a merchant (i.e., the merchant computer system 160). The merchant may then provide the non-payment token to the token vault computer system 110 in exchange for the de-tokenized (e.g., decrypted) non-payment information. The account holder may continue to update the stored token at the single-location token vault computer system 110 so that any third parties that have been provided the token are able to obtain the updated non-payment information without further communication by the account holder to any individual merchants or other parties.

In an example embodiment, an account holder may want for a merchant (i.e., the merchant computer system 160) to have access to the account holder's current shipping address at any time. The account holder may send a tokenization request to the token vault computer system 110 to request that the account holder's shipping address be tokenized. Once the token is provisioned, the account holder may then provide the token to the merchant. The merchant may then provide the token to the token vault computer system 110 in exchange for the account holder's current shipping address (or verification of the shipping address). By providing the token to the merchant, the account holder authorizes the merchant to obtain the account holder's shipping address and any other information related to the token. The tokens and the associated information are stored at the token vault computer system 110. The merchant stores only the token rather than having to store the related information.

The account holder may also request that the token be updated to change the shipping address or make additional information available to the merchant. Additional information may include a title of ownership, insurance information, personal identifying information, records of past transactions with the merchant, payment schedules, celebrated birthdays and holidays, upcoming transactions, and other information that may be useful to the merchant. The token vault computer system 110 is configured to manage the token, including updating the token according to requests received from the account holder. The merchant may request current information using the token at any time. The token vault computer system 110 may provide or verify the current information to the merchant in exchange for the token and/or additional value. The merchant may continually update the files and data attributes of its customer (i.e., the account holder) using the non-payment token.

The token vault computer system 110 is configured to store various preferences related to the tokens. For instance, the account holder may provide preferences related to each individual merchant that is provided with the token. For instance, the token vault computer system 110 may store for each token (a) the merchant(s) that have received the token and those that are allowed to have/use the token, (b) contract provisions that govern how the merchant is allowed to use the token and the related information, (c) attributes and/or rules regarding the specific data fields of the account holder that the merchant is allowed to retrieve when presenting the token to the token vault computer system 110, (d) rules regarding when access is revocable (e.g., access expires after 90 days), and (e) specific transaction use cases.

In another example embodiment, an account holder may securely provide sensitive information to an intended party via an intermediary. For instance, the account holder may be required to provide personal identifying information (e.g., a social security number) to an intermediary in order to obtain a background check or credit check, apply for a loan, apply to rent an apartment, and the like. The token vault computer system 110 may tokenize the personal identifying information at the request of the account holder. The account holder may then provide the provisioned token to the intermediary to provide to the intended party (e.g., a credit agency, a police department, a loan officer, etc.). The account holder may also update the preferences for the provisioned token so that the intended party, and not the intermediary, is provided access to the tokenized personal identifying information in exchange for the token. The token vault computer system 110 may then provide the personal identifying information to only the intended party, and not the intermediary, based on the preferences of the account holder. The token vault computer system 110 may require additional information to verify the identity of the intended party prior to releasing the personal identifying information. In this way, the token vault computer system 110 ensures that the intermediary does not have access to the sensitive information.

The token vault computer system 110 may also be configured to group certain non-payment information according to intended use. For instance, the token vault computer system 110 may automatically generate non-payment tokens based on information that is required when purchasing a car, when purchasing a home, when applying for college, when applying for rental housing, etc. The account holder may then provide these non-payment tokens to a third party, depending on the particular application, to more quickly and efficiently provide any required information.

Figure 3:
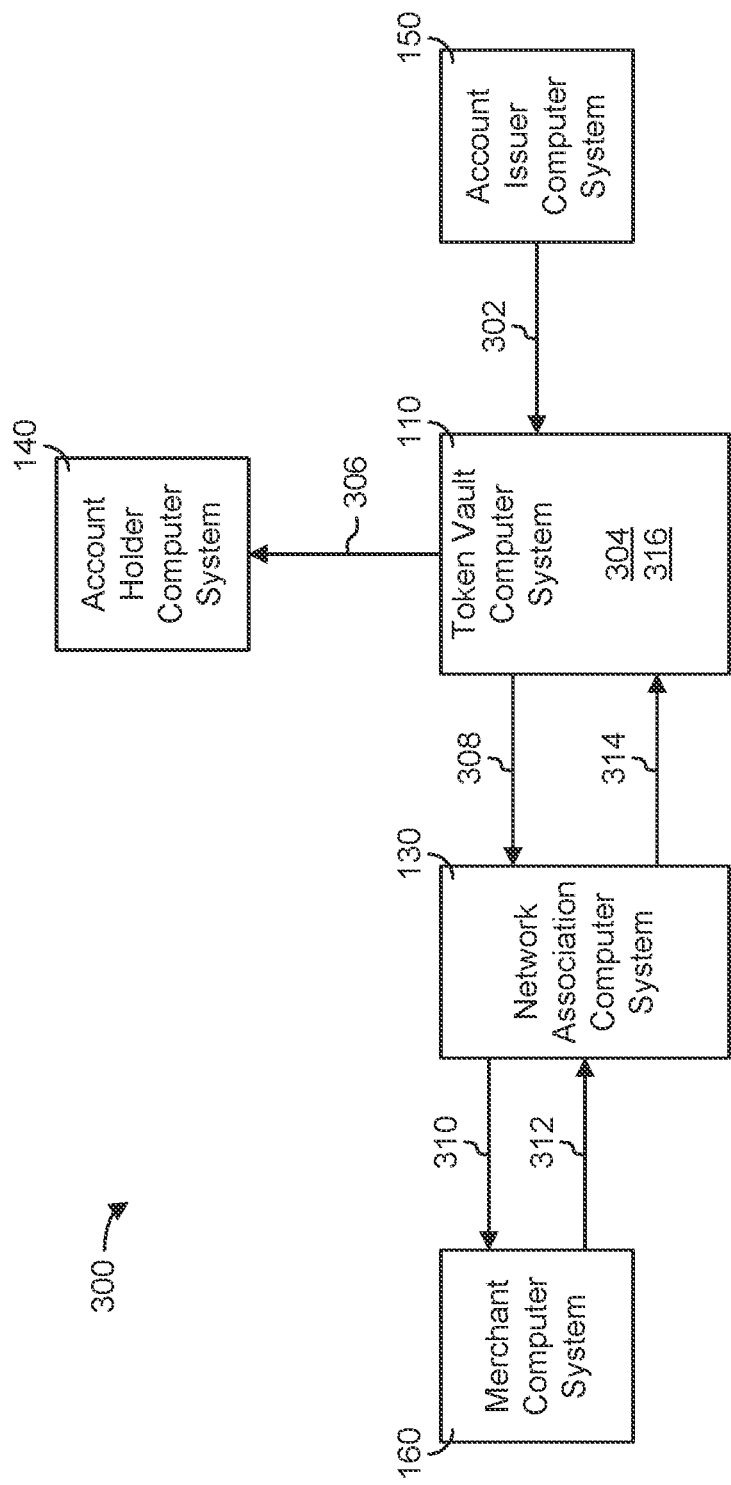
FIG. 3 is a schematic diagram of a token life cycle management process that may be implemented using the system shown in FIG. 1.

Referring now to FIG. 3, a process 300 is shown for updating a payment token, according to an example embodiment. The process 300 may be performed using the token vault computer system 110 shown in FIG. 1. In particular, the process 300 may be performed using the life cycle management logic 116 of the token vault computer system 110. In an example embodiment, the process 300 is performed after the process 200 is performed to provision the payment token. At 302, a request is received at the token vault computer system 110 to update a payment token. The request may include information for identifying the payment token, including information related to an account holder, an associated financial product, or any information otherwise associated with the financial product. The token vault computer system 110 (i.e., the life cycle management logic 116) may be configured to authenticate the update request based on the information received. The token vault computer system 110 may also request additional information from the entity requesting an update and authenticate the update request based on the additional information. For instance, the token vault computer system 110 may be configured to request identifying information or other credentials from any entity requesting an update to a payment token.

In an example embodiment, the token vault computer system 110 receives an update request from the account issuer computer system 150. The update request is related to a payment token associated with a financial product issued by the account issuer computer system 150. At 304, the token vault computer system 110 is configured to update the payment token based on the update request. For instance, the token vault computer system 110 may receive the update request from the account issuer computer system 150 and determines an appropriate update for the payment token based on the request. As an example, the update request may indicate that the account holder has closed the credit card account (i.e., financial product) associated with the payment token. In this embodiment, the life cycle management logic 116 is configured to permanently de-activate the payment token. The life cycle management logic 116 may also be configured to suspend a payment token upon receiving an indication that the account holder is past due on a payment. In other embodiments, the token vault computer system 110 is configured to update the payment token absent an update request. In these embodiments, the life cycle management logic 116 may update the payment token based on an event or action determined by the token vault computer system 110. For example, the life cycle management logic 116 may expire a payment token based on exceeding a time threshold associated with the payment token.

Although the updates described herein are related to the life cycle of the payment token, at 304 the token vault computer system 110 may also be configured to otherwise update the payment token based on an inquiry. For instance, the token vault computer system 110 may receive an inquiry (e.g., from the account issuer computer system 150) of a payment token and update the payment token to indicate that the inquiry was received. The token vault computer system 110 may also provide information to the account issuer computer system 150 and/or another entity of system 100 based on the inquiry. Any information related to the payment token updates may be stored in the token history 124.

At 306, the token vault computer system 110 is configured to generate and send a notification to the account holder computer system 140. The notification may provide an indication that the payment token has been updated. The notification may be sent to the account holder based on settings related to the payment token and/or the account holder. For instance, the token vault computer system 110 may generate notification settings for each payment token and/or account holder. The notification settings may be generated based on the token request (i.e., when the payment token is provisioned). The notification settings may also be modified based on input received from the account holder. In some embodiments, the token vault computer system 110 may only send notifications to the account holder based on specified updates, such as when the payment token is de-activated or expired. The token vault computer system 110 may send the notification to a mobile device of the account holder, such as when the mobile device is associated with the payment token. In one embodiment, the notification may be sent using the token notification logic 120.

At 308, the token vault computer system 110 is configured to send a notification to the network association computer system 130. The token vault computer system 110 may identify the appropriate network association based on the payment token. The notification is based on the payment token and may provide an indication that the payment token has been updated. The notification sent to system 130 may be the same or similar to the notification sent to system 140. The notification may be sent to the network association computer system 130 based on settings related to the payment token and/or the network association. At 310, the network association computer system 130 delivers the notification to the merchant computer system 160. The network association computer system 130 may identify the merchant computer system 160 based on the payment token, including based on settings related to the payment token and stored at the token vault computer system 110. In other embodiments, the token vault computer system 110 sends the notification directly to the merchant computer system 160. In these embodiments, the token vault computer system 110 is configured to identify the merchant computer system 160 based on the payment token.

At 312, the merchant computer system 160 sends a confirmation to the network association computer system 130 that the notification has been received. At 314, the network association computer system 130 delivers the confirmation to the token vault computer system 110. In other embodiments, the token vault computer system 110 may receive the confirmation directly from the merchant computer system 160. The merchant computer system 160 may identify the network association computer system 130 and/or the token vault computer system 110 based on the notification and/or based on information stored on the payment token. Similarly, the network association computer system 130 may identify the token vault computer system 110 based on the notification and/or the payment token. At 316, the token vault computer system 110 stores the confirmation received from the merchant computer system 160. The confirmation may be stored in the token history 124. The token vault computer system 110 may also store a confirmation received from the account holder computer system 140 in the token history 124.

Figure 4:
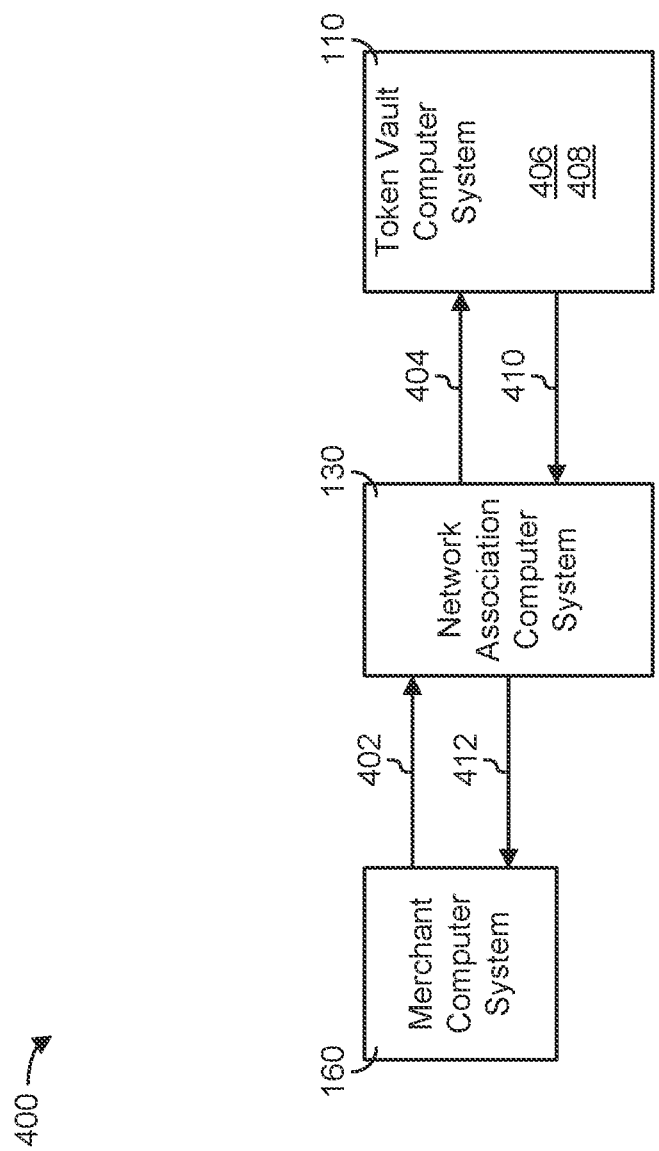
FIG. 4 is a schematic diagram of another token life cycle management process that may be implemented using the system shown in FIG. 1.

Referring now to FIG. 4, another process 400 is shown for updating a payment token, according to an example embodiment. The process 400 may be performed using the token vault computer system 110 shown in FIG. 1. In particular, the process 400 may be performed using the life cycle management logic 116 of the token vault computer system 110. At 402, the token requestor (e.g., the merchant computer system 160) sends a request to the network association computer system 130 to update a payment token. At 404, the network association computer system 130 delivers the request to the token vault computer system 110. In other embodiments, the merchant computer system 160 may send the update request directly to the token vault computer system 110.

The payment token may be associated with the token vault computer system 110. In one embodiment, the payment token was provisioned by the token vault computer system 110. The payment token is also stored at the token vault computer system 110. The merchant computer system 160 may identify the network association computer system 130 and/or the token vault computer system 110 based on the payment token. Likewise, the network association computer system 130 may identify the token vault computer system 110 based on the payment token. For instance, an identity of any or all of the systems 110, 130, and 160 may be included within the payment token and any or all of the systems 110, 130, and 160 may be configured to at least partially decrypt the payment token to determine the identity.

The update request may include information related to the payment token, including a reason for updating the payment token. For instance, the update request may include one or more transactions performed using the payment token. The update request may also include an update related to the financial product associated with the payment token, such as a new account number or expiration date for the financial product. The update request may also include a new account holder for the financial product. At 306, the token vault computer system 110 is configured to update the payment token based on the update request. The token vault computer system 110 may update the status of the payment token, such as by activating, suspending, resuming, de-activating, or expiring the payment token based on the update request. The token vault computer system 110 may be configured to authenticate the update request based on the information received within the update request. For instance, the token vault computer system 110 may require authenticating credentials to be included within the update request in order to process the update.

At 408, the token vault computer system 110 stores the update request and any related information in the token history 124. The token vault computer system 110 may also store the updated payment token in the token repository 122. At 410, the token vault computer system 110 sends a response (e.g., confirmation) to the network association computer system 130, indicating that the payment token has been updated. The token vault computer system 110 may also send the updated payment token to the system 130 as part of the response. At 412, the network association computer system 130 delivers the response to the merchant computer system 160. In other embodiments, the token vault computer system 110 may deliver the response directly to the merchant computer system 160. Where the token requestor is not the account holder (i.e., account holder computer system 140), the token vault computer system 110 may also send a notification to the account holder computer system 140 indicating that the payment token has been updated.

In an example embodiment, the account holder may send a tokenization request to the token vault computer system 110 for a payment token related to a financial product of the account holder. The payment token provisioned by the computer system 110 may then be provided to online merchants rather than providing credit card information or other payment information. The online merchants may then be required to provide the payment token to the token vault computer system 110 to initiate a payment. The token vault computer system 110 is configured to authorize the transaction based on preferences provided by the account holder. The token vault computer system 110 also tracks every transaction and stores any related information for use by the account holder. The token vault computer system 110 also maintains a record of any data or information that is provided to the online merchants. The token vault computer system 110 may also report to the account holder any online merchants that have the account holder's payment information and/or payment token. The account holder may the restrict use based on the user preferences stored at the token vault computer system 110. The account holder may also delete or disable any payment tokens.

The token vault computer system 110 may also provide an interface to the account holder for managing the stored tokens. In an example embodiment, the account holder accesses the token vault computer system 110 via an online interface or a mobile application. The account holder is able to request that a token be provisioned and manage any existing tokens stored at the token vault computer system 110 using the mobile application. The account holder may also adjust various user preferences related to the tokens using the mobile application.

The token vault computer system 110 may also be configured to collect data based on provisioned tokens and tokens that are provided to third parties. For instance, the token vault computer system 110 could provide a map showing geographic or virtual locations where the account holder has provided a token or where a token has been used. The token vault computer system 110 could also mine additional data related to the payment tokens, including purchases, preferences, and other transaction data that could be used to provide additional services and targeted products to the account holder.

Figure 5:
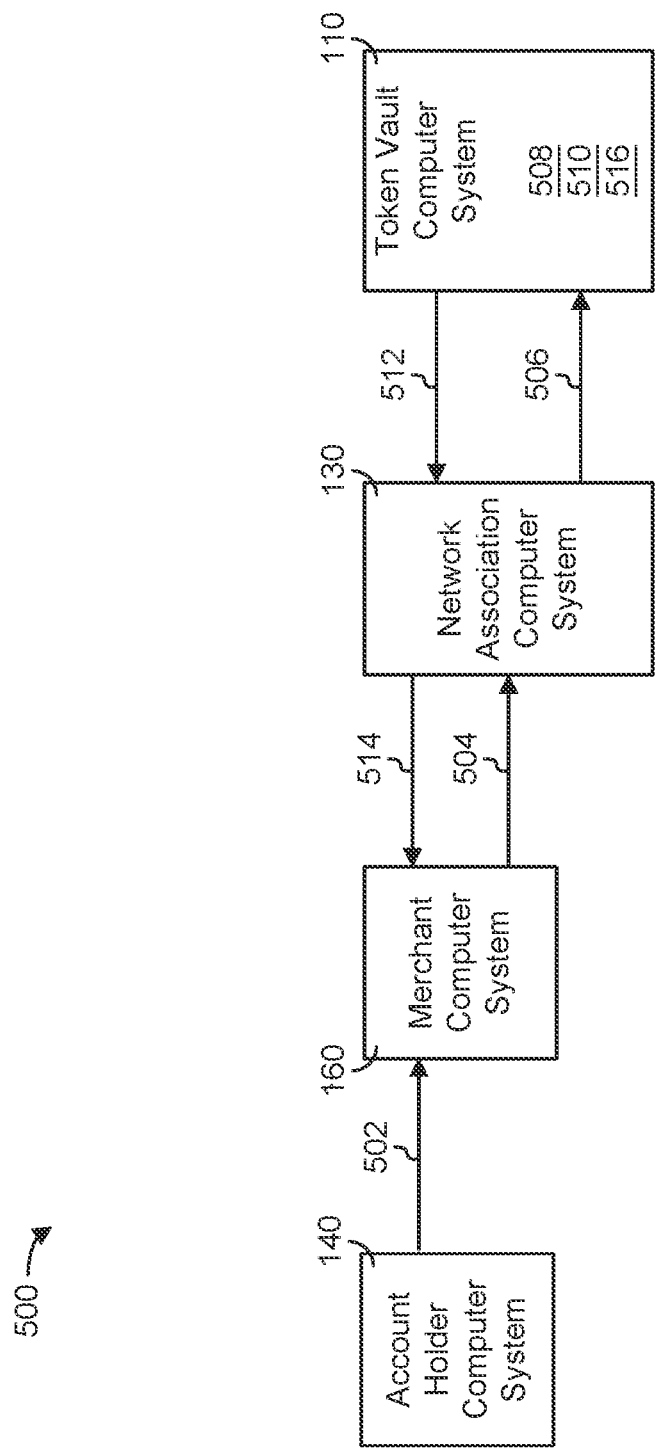
FIG. 5 is a schematic diagram of a transaction authorization process that may be implemented using the system shown in FIG. 1.

Referring now to FIG. 5, a process 500 is shown for authorizing a payment token as part of a financial transaction, according to an example embodiment. The process 500 may be at least partially performed using the token vault computer system 110 shown in FIG. 1. In particular, the process 500 may be at least partially performed using the transaction authorization logic 114 of the token vault computer system 110. At 502, an account holder (i.e., account holder computer system 140) sends a payment token to a merchant (i.e., merchant computer system 160) to initiate a transaction. For instance, one of the account holder and the merchant may scan the payment token from a device of the other of the account holder and the merchant in order to send the payment token to the merchant computer system 160. The payment token may include a cryptogram (i.e., encrypted data) for account information that may be useable by the merchant computer system 160 to process the transaction once the cryptogram is decrypted.

At 504, the merchant computer system 160 sends the payment token to the network association computer system 130 based on the payment token. The payment token may include identifying information for the network association computer system 130 that is readable by the merchant computer system 160. In one embodiment, the merchant computer system 160 is configured to decrypt at least a portion of the payment token to identify the network association computer system 130. For instance, the merchant computer system 160 may be provided with a decryption key (e.g., by the token vault computer system 110, by the account holder computer system 140, etc.) in order to identify an appropriate entity to send the payment token for authorization.

At 506, the network association computer system 130 delivers the payment token to the token vault computer system 110 based on the payment token. Similarly, the payment token may include identifying information for the token vault computer system 110 that is readable by the network association computer system 130. In one embodiment, the network association computer system 130 is configured to decrypt at least a portion of the payment token to identify the token vault computer system 110. For instance, the network association computer system 130 may be provided with a decryption key (e.g., by the token vault computer system 110, by the account holder computer system 140, etc.) in order to identify an appropriate entity to send the payment token for authorization. In another embodiment, the merchant computer system 160 delivers the payment token directly to the token vault computer system 110 based on the payment token. In this embodiment, the merchant computer system 160 may be configured to identify the token vault computer system 110 based on the payment token.

At 508, the token vault computer system 110 authenticates the payment token. The token vault computer system 110 may authenticate the payment token by validating encrypted data (i.e., a cryptogram) stored within the payment token. For instance, the token vault computer system 110 may authenticate the payment token by verifying that the payment token was provisioned by the token vault computer system 110. The payment token may also be authenticated by verifying that the payment token was received from the account holder computer system 140. The payment token may also be authenticated by verifying any other information stored as a cryptogram within the payment token, such as account holder information, information related to the associated financial product, provisioning data, or by matching any other data stored on the payment token with data stored at the token vault computer system 110 (e.g., token history 124). As part of authenticating the payment token, the token vault computer system 110 may decrypt the payment token to reveal account information necessary to process the transaction.

At 510, the token vault computer system 110 may re-encrypt the account information. For instance, the account information may be tokenized similarly to when the payment token was provisioned. The account information may be encrypted in order to securely send the account information to the merchant computer system 160 to complete the transaction. At 512, the encrypted account information is sent by the token vault computer system 110 to the network association computer system 130 as an indication that the transaction has been authorized by the token vault computer system 110. At 514, the network association computer system 130 delivers the encrypted account information to the merchant computer system 160. In an example embodiment, at least the merchant computer system 160 is provided with a key or rules for decrypting the encrypted account information in order to process the transaction. In other embodiments, the token vault computer system 110 may deliver the encrypted account information directly to the merchant computer system 160.

At 516, the token vault computer system 110 is configured to store any actions related to the payment token within the token history 124. The token vault computer system 110 may also update the payment token at the token repository 122, including to update the status of the payment token.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer system, comprising:
one or more servers configured to, independently or collectively:
provision a payment token based on a token request for a financial product, the token request including financial product information comprising account information that is to be tokenized and identity information of an account holder, comprising:
verifying that the financial product is associated with the account holder, and determining that the financial product is eligible for tokenization based on the financial product information, wherein determining that the financial product is eligible for tokenization comprises:
  determining a type of the financial product; and
  determining that the financial product is eligible in response to determining that eligibility rules indicate that the type of the financial product is eligible for tokenization;
generate the payment token in response to the determination that the financial product is eligible;
determine, based on preferences of the account holder associated with the financial product, merchants that are allowed to receive the payment token;
encrypt the payment token;
transmit the encrypted payment token and a decryption key for decrypting the encrypted payment token to a token requestor;
receive the payment token and a request for personal identifying information of the account holder from a first merchant; and
provide access to particular data fields of the account holder to the first merchant based on associated rules governing access to data fields associated with the account holder, the particular data fields including the personal identifying information of the account holder requested by the first merchant.

2. The computer system of claim 1, wherein to provision the payment token, the one or more servers are further configured to:
  filter the financial product information to exclude words or characters based on filter settings; and
  generate rules for the payment token based on the preferences of the account holder associated with the financial product.

3. The computer system of claim 1, wherein generating the payment token further comprises generating the payment token in response to filtering of the financial product information to remove selected content based on filter settings.

4. The computer system of claim 1, wherein the one or more servers are further configured to determine the associated rules comprising instructions to provide access to the particular data fields based on the preferences.

5. The computer system of claim 1, wherein provisioning the payment token further includes, upon generating the payment token, activating the payment token for use as a payment credential.

6. The computer system of claim 1, wherein the financial product is unrelated to a payment card, and wherein the payment token is useable to make a payment via the financial product.

7. The computer system of claim 1, wherein the payment token is generated by encrypting at least a portion of the financial product information.

8. The computer system of claim 1, wherein the one or more servers are further configured to:
  receive a request to authorize a transaction involving the payment token; and
  authorize the transaction based on the payment token.

9. The computer system of claim 8, wherein the one or more servers are further configured to update a status of the payment token based on the transaction.

10. The computer system of claim 1, wherein the associated rules comprise merchant rules that vary between different merchants.

11. The computer system of claim 1, wherein provisioning the payment token includes filtering words or characters from the payment token based on inputs received from a merchant computer system of the first merchant.

12. The computer system of claim 1, wherein determining the type of the financial product comprises determining that the financial product is one of a payment card-type or a bank account-type, and wherein the eligibility rules indicate that a financial product of the payment card-type or the bank account-type is eligible for tokenization.

13. The computer system of claim 1, wherein determining the type of the financial product comprises determining that the financial product is one of a credit card, a debit card, or a bank account, and wherein the eligibility rules indicate that credit cards, debit cards, and bank accounts are eligible for tokenization.

14. The computer system of claim 1, wherein the one or more servers are further configured to verify an identity of the first merchant as an intended party by cross-referencing a merchant identifier of the request from the first merchant with the associated rules.

15. A method, comprising:
  provisioning, by a token vault computer system, a payment token based on a token request for a financial product, the token request including financial product information comprising account information that is to be tokenized and identity information of an account holder, comprising:
    verifying that the financial product is associated with the account holder, and determining that the financial product is eligible for tokenization based on the financial product information, wherein determining that the financial product is eligible for tokenization comprises:
      determining a type of the financial product; and
      determining that the financial product is eligible in response to determining that eligibility rules indicate that the type of the financial product is eligible for tokenization;
  generating, by the token vault computer system, the payment token in response to the determination that the financial product is eligible;
  determining, based on preferences of the account holder associated with the financial product, merchants that are allowed to receive the payment token; and
  encrypting the payment token;
  transmitting the encrypted payment token and a decryption key for decrypting the encrypted payment token to a token requestor;
  receiving, by the token vault computer system, the payment token and a request for personal identifying information of the account holder from a first merchant; and
  providing, by the token vault computer system, access to particular data fields of the account holder to the first merchant based on associated rules governing access to data fields associated with the account holder, the data fields including the personal identifying information of the account holder requested by the first merchant.

16. The method of claim 15, wherein the payment token is generated by encrypting at least a portion of the financial product information.

17. The method of claim 15, further comprising:
  receiving, by the token vault computer system, a request to authorize a transaction involving the payment token;
  authorizing, by the token vault computer system, the transaction based on the payment token; and updating, by the token vault computer system, a status of the payment token based on the transaction.

18. The method of claim 15, further comprising, prior to generating the payment token:
selecting, by the token vault computer system, a unique identifier for use as the payment token; and
determining, by the token vault computer system, that the unique identifier is available for use.

19. The method of claim 15, further comprising:
transmitting, by the token vault computer system, a token eligibility request to a financial product issuer system; and
confirming, by the token vault computer system, that the financial product is eligible for tokenization based on a response to the token eligibility request received from the financial product issuer system.

20. The method of claim 15, further comprising storing the encrypted payment token in a token repository of the token vault computer system.

* * * * *